United States Patent [19]

Io

[11] Patent Number: 4,784,002
[45] Date of Patent: Nov. 15, 1988

[54] TORQUE SENSOR

[75] Inventor: Shinichi Io, Atsugi, Japan

[73] Assignee: Atsugi Motor Parts Company, Limited, Japan

[21] Appl. No.: 62,551

[22] Filed: Jun. 15, 1987

[30] Foreign Application Priority Data

Dec. 17, 1986 [JP] Japan ............................. 61-302092
Dec. 23, 1986 [JP] Japan ............................. 61-307214
Jan. 9, 1987 [JP] Japan ................................ 62-2753
Jan. 9, 1987 [JP] Japan ................................ 62-2754

[51] Int. Cl.$^4$ ............................................. G01L 3/10
[52] U.S. Cl. ................................ 73/862.33; 324/208; 324/226; 324/251
[58] Field of Search .................. 73/862.33, DIG. 3; 324/208, 207, 228, 226, 234, 235, 251, 262

[56] References Cited

U.S. PATENT DOCUMENTS

| 3,170,323 | 2/1965 | Kuhrr et al. | 73/DIG. 3 |
| 4,119,911 | 10/1978 | Johnson, Jr. | 324/208 |
| 4,448,275 | 5/1984 | Kitagawa et al. | 73/862.33 |
| 4,682,104 | 7/1987 | Lombard et al. | 324/208 |
| 4,724,710 | 2/1988 | Murty | 73/862.33 |

FOREIGN PATENT DOCUMENTS 54-17228 2/1979 Japan .
55-44013 3/1980 Japan .
57-192872 12/1982 Japan .
58-5626 1/1983 Japan .
58-105877 6/1983 Japan .
58-101153 7/1983 Japan .
58-1944664 11/1983 Japan .
58-218627 12/1983 Japan .
61-21861 1/1986 Japan .

Primary Examiner—Stewart J. Levy
Assistant Examiner—Robert R. Bell
Attorney, Agent, or Firm—Lane and Aitken

[57] ABSTRACT

A torque sensor comprising a first shaft having a fore end portion which is constructed such that a displacement of torsion thereof occurs; a second shaft connected to the first shaft through the fore end portion; a plurality of first magnetic segments each having a N-pole as a fixed magnetic pole and second magnetic segments each having a S-pole as a fixed magnetic pole; a plurality of first magnetism pickup path members and second magnetism pickup path members corresponding in number to the N-pole of the first magnetic segments and the S-pole of the second magnetic segments, respectively; and a magnetism detecting element provided in the first shaft so that it does not contact with the first shaft and adapted for detecting change in magnetic flux passsing through the first and second magnetism pickup path members. The displacement of torsion of the first shaft is detected by change in magnetic flux passing through the first and second magnetism pickup path members when the N-pole of the first magnetic segment is displaced toward the first or second magnetism pickup path member.

8 Claims, 19 Drawing Sheets

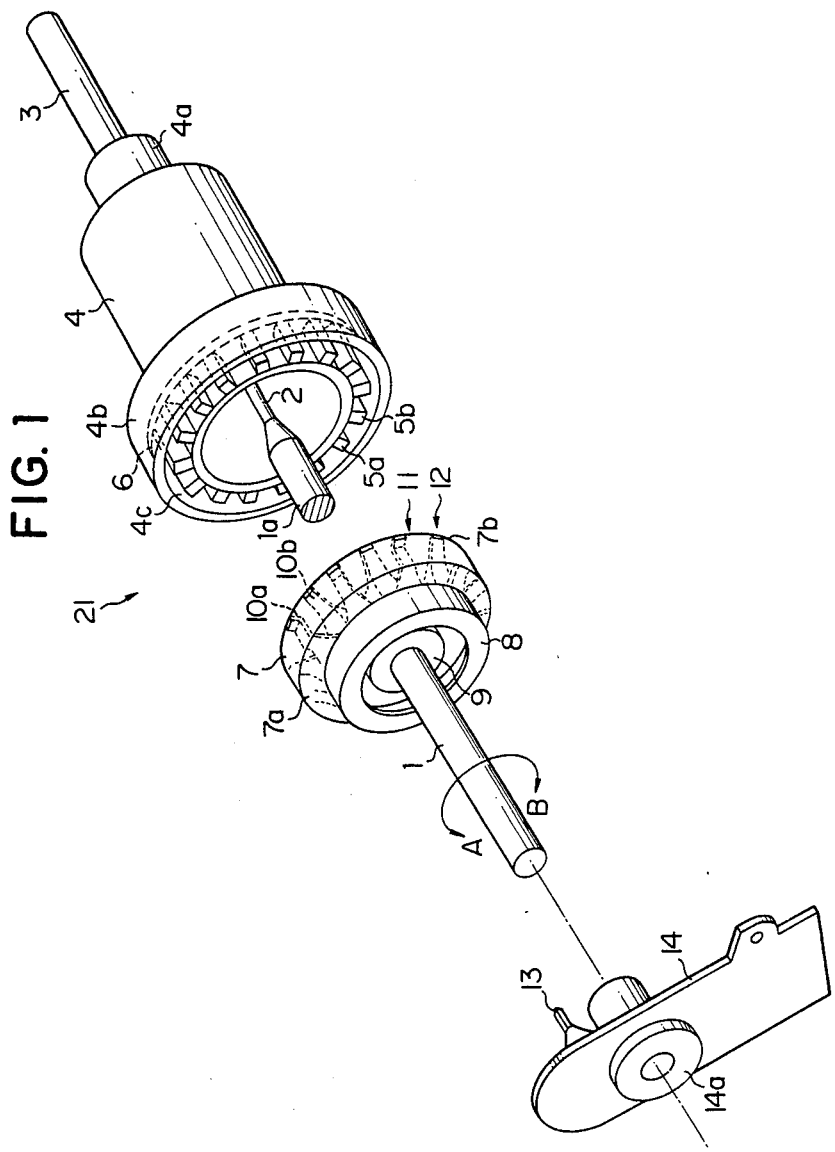

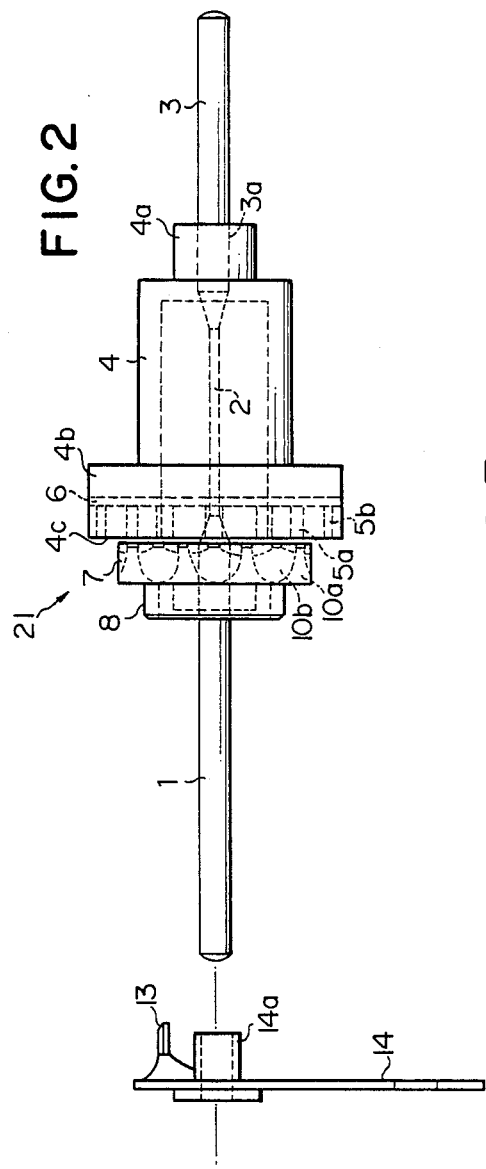
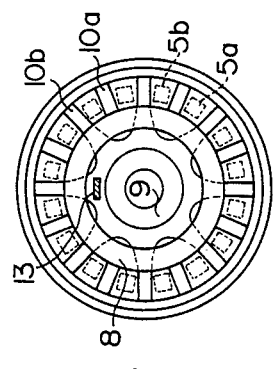

$\phi_1 \gg |\phi_2|$
$\phi_2 = -\phi_2$ $\phi_2 < |-\phi_2|$ $|-\phi_2| < \phi_2$

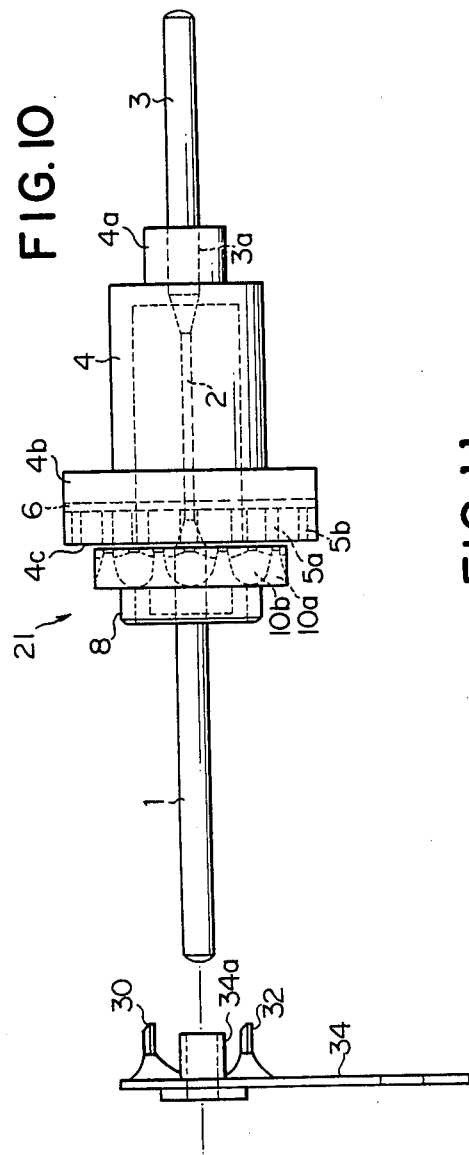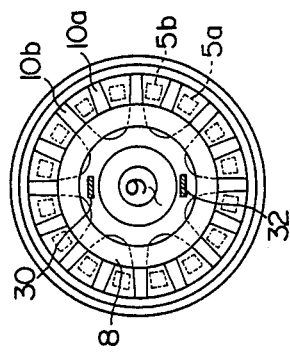

DENSITY OF MAGNETIC FLUX

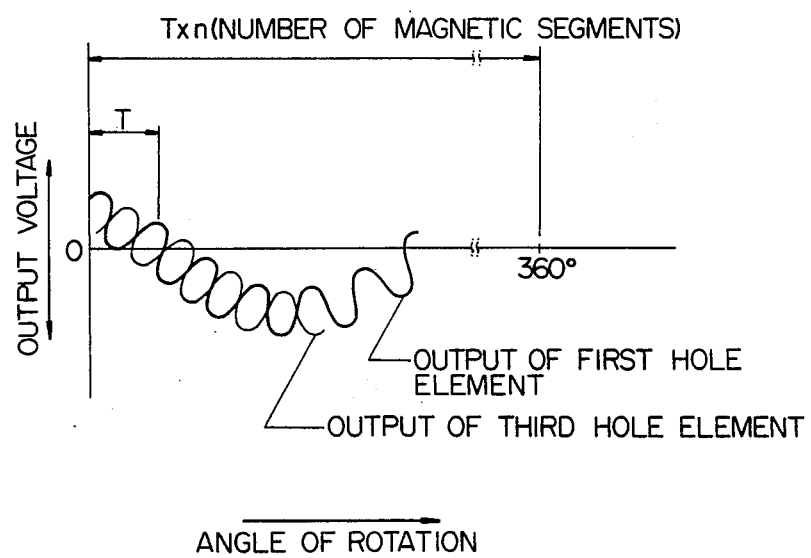

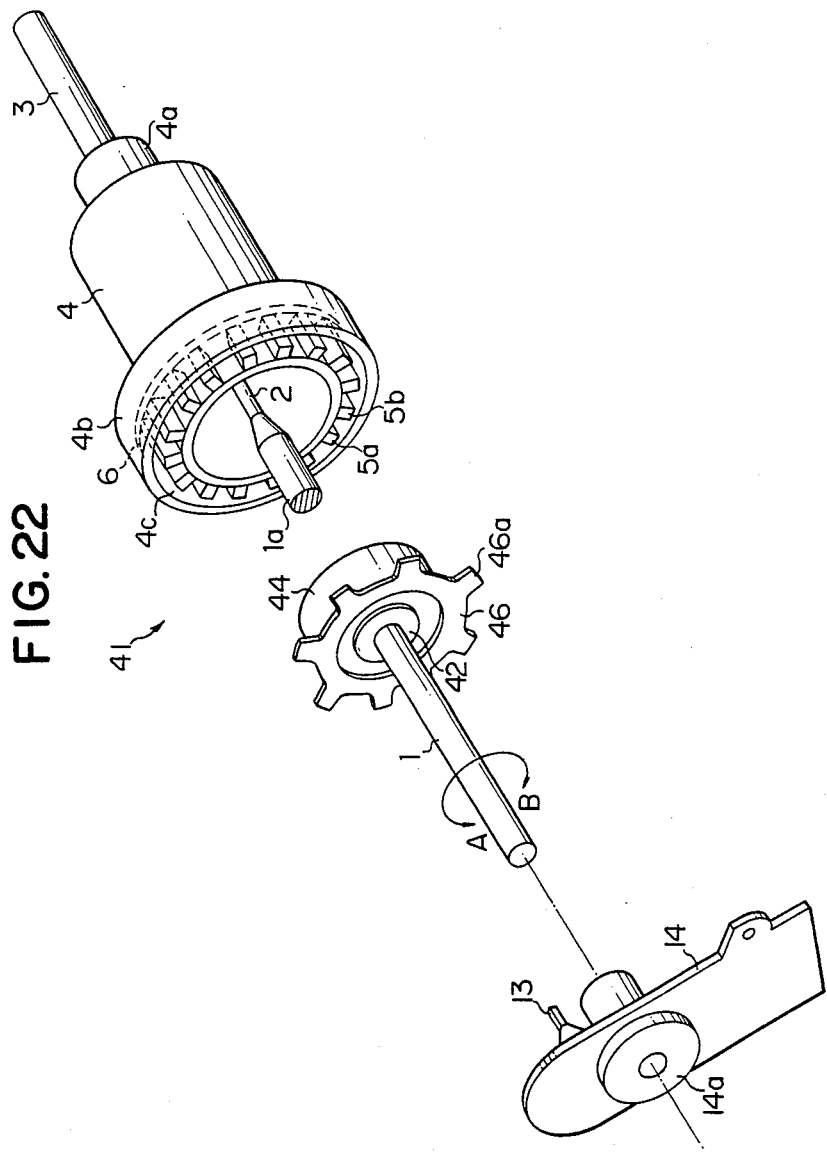

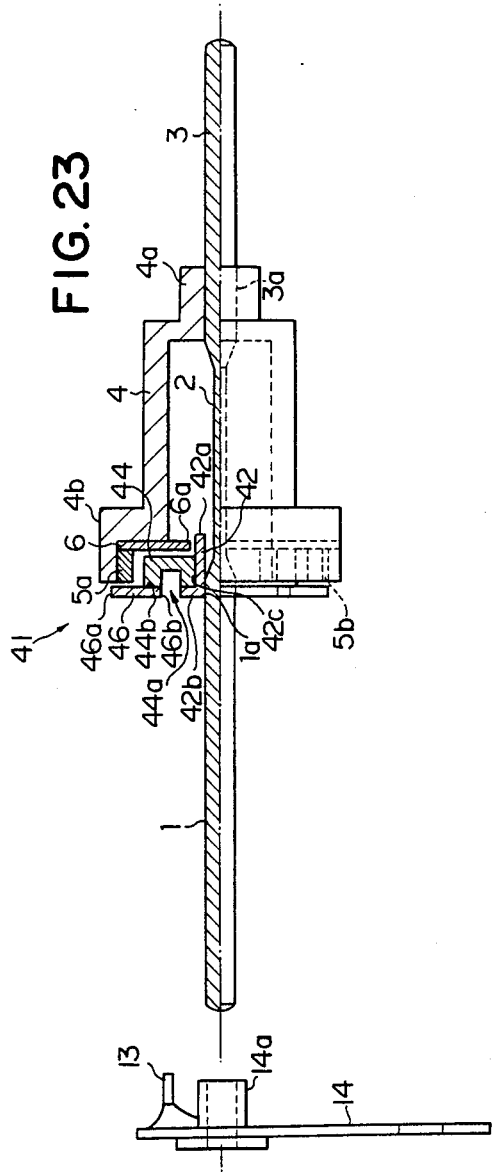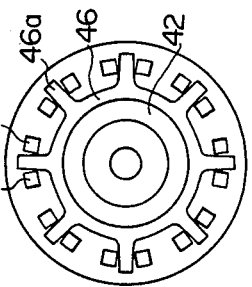

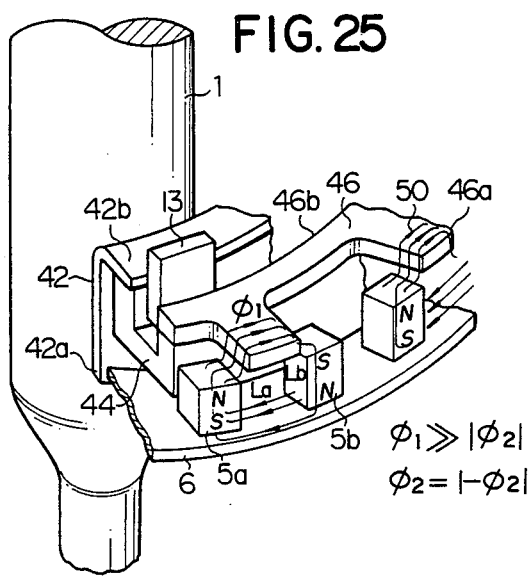
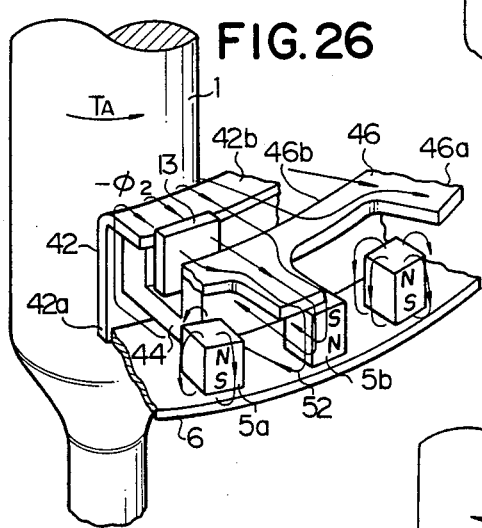
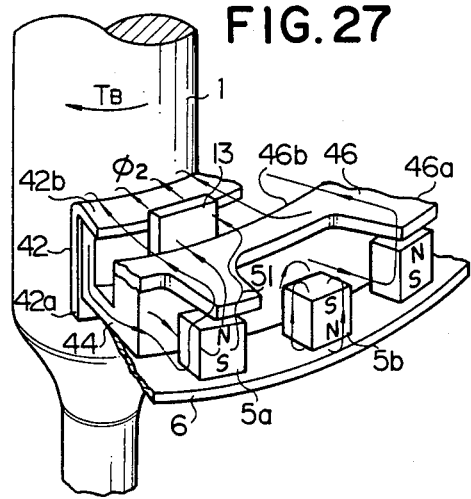

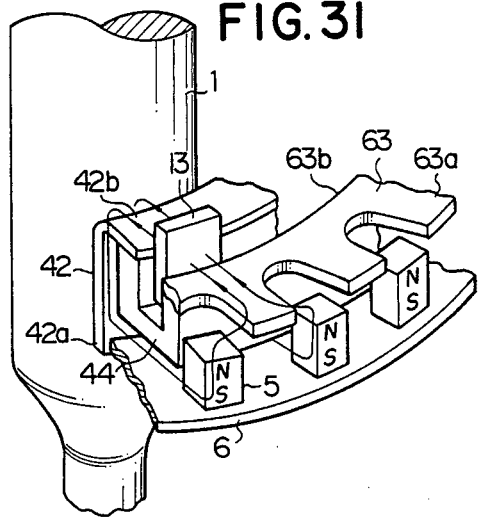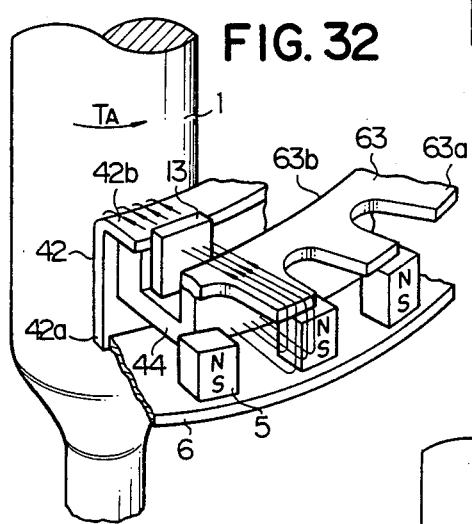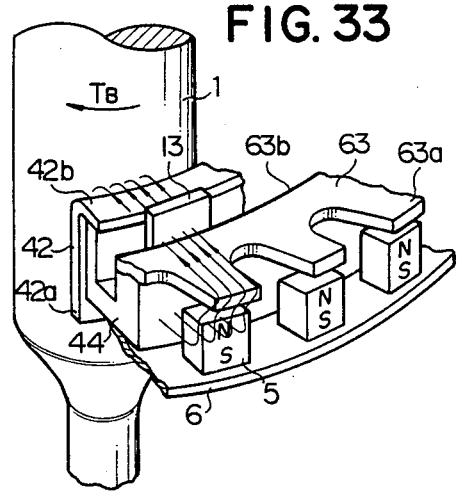

TORQUE SENSOR

FIELD OF THE INVENTION

The present invention relates in general to a torque sensor, and in particular to a torque sensor of the non-contact type which detects a torque of rotation without contacting.

SUMMARY OF THE INVENTION

In accordance with one important aspect of the present invention, there is provided a torque sensor comprising a first shaft having a fore end portion which is constructed such that a displacement of torsion thereof occurs; a second shaft connected to the first shaft through the fore end portion; a plurality of first magnetic segments each having a N-pole as a fixed magnetic pole and second magnetic segments each having a S-pole as a fixed magnetic pole, the first and second segments being secured to the second shaft so that the first and second magnetic segments surround the fore end portion of the first shaft and are alternatively arranged around the fore end portion; a plurality of first magnetism pickup path members and second magnetism pickup path members corresponding in number to the N-pole of the first magnetic segments and the S-pole of the second magnetic segments, respectively, the first and second pickup path members being alternatively arranged so that each path member faces two adjacent first and second magnetic segments and is located midway between the two adjacent first and second magnetic segments; and a magnetism detecting element provided in the first shaft so that it does not contact with the first shaft and adapted for detecting change in magnetic flux passing through the first and second magnetism pickup path members; the displacement of torsion of the first shaft with respect to the second shaft being detected by change in magnetic flux passing through the first and second magnetism pickup path members when the N-pole of the first magnetic segment is displaced toward the first or second magnetism pickup path member by torsional displacement of the first shaft with respect to the second shaft.

In accordance with another important aspect of the present invention, there is provided a torque sensor comprising a first shaft having a fore end portion which is constructed such that a displacement of torsion thereof occurs; a second shaft connected to the first shaft through the fore end portion; a plurality of first magnetic segments each having a N-pole as a fixed magnetic pole and second magnetic segments each having a S-pole as a fixed magnetic pole, the first and second segments being secured to the second shaft so that the first and second magnetic segments surround the fore end portion of the first shaft and are alternatively arranged around the fore end portion; a plurality of first magnetism pickup path members and second magnetism pickup path members corresponding in number to the N-pole of the first magnetic segments and the S-pole of the second magnetic segments, respectively, the first and second pickup path members being alternatively arranged so that each path member faces two adjacent first and second magnetic segments and is located midway between the two adjacent first and second magnetic segments; and a plurality of magnetism detecting elements each provided in the first shaft so that it does not contact with the first shaft and each adapted for detecting change in magnetic flux passing through the first and second magnetism pickup path members, at least two the magnetism detecting elements being provided at predetermined angles with respect to an center axis of the first shaft so that a mechanical eccentricity in the first and second magnetism pickup path members from the center axis of the first shaft is corrected; the displacement of torsion of the first shaft with respect to the second shaft being detected by change in magnetic flux passing through the first and second magnetism pickup path members when the N-pole of the first magnetic segment is displaced toward the first or second magnetism pickup path member by torsional displacement of the first shaft with respect to the second shaft. The plurality of magnetism detecting elements may comprise two magnetism detecting elements which are adapted for correcting the eccentricity and which are spaced with each other an angle of 180 degrees with respect to the center axis of the first shaft. Also, the plurality of magnetism detecting elements may comprise first and second magnetism detecting elements which are spaced with each other an angle of 180 degrees with respect to the center axis of the first shaft, and a third magnetism detecting element which is adapted for correcting unevenness in magnetic flux between the first and second pickup path members which are corrected in the eccentricity.

In accordance with another important aspect of the present invention, there is provided a torque sensor comprising a first shaft having a fore end portion which is constructed such that a displacement of torsion thereof occurs; a second shaft connected to the first shaft through the fore end portion; a plurality of pairs of first magnetic segment having a N-pole as a fixed magnetic pole and second magnetic segment having a S-pole as a fixed magnetic pole, the first and second segments being secured to the second shaft so that the first and second magnetic segments surround the fore end portion of the first shaft; a plurality of first magnetism pickup path members corresponding in number to the pairs of the first magnetic segment and second magnetic segment; each magnetism pickup path member being arranged so that it faces two adjacent N-pole and S-pole of the pair of fixed magnetic poles and is located midway between the two adjacent N-pole and S-pole; a second magnetism pickup path member for returning magnetic flux passing through the first magnetism pickup path members to each fixed magnetic pole; a magnetism detecting element provided in the first shaft so that it does not contact with the first shaft and adapted for detecting an amount of magnetic flux passing through the first and second magnetism pickup path members; the displacement of torsion of the first shaft with respect to the second shaft being detected by change in magnetic flux passing through the first and second magnetism pickup path members when the first magnetism pickup path member is displaced toward the N-pole or S-pole of the pair by torsional displacement of the first shaft with respect to the second shaft. The first magnetism pickup path members may be constituted by eight tooth profile projections fixed with respect to the first shaft.

In accordance with another important aspect of the present invention, there is provided a torque sensor comprising a first shaft having a fore end portion which is constructed such that a displacement of torsion thereof occurs; a second shaft connected to the first shaft through the fore end portion; a plurality of magnetic segments each having the same pole as a fixed magnetic pole, the segments being secured to the second shaft so that the magnetic segments surround the fore end portion of the first shaft; a plurality of first magnetism pickup path members corresponding in number to the fixed magnetic poles of the magnetic segments; each magnetism pickup path member being arranged so that it faces two adjacent fixed magnetic poles and is located midway between the two adjacent fixed magnetic poles; a second magnetism pickup path member for returning magnetic flux passing through the first magnetism pickup path members to each fixed magnetic pole; a magnetism detecting element provided in the first shaft so that it does not contact with the first shaft and adapted for detecting an amount of magnetic flux passing through the first and second magnetism pickup path members; the displacement of torsion of the first shaft with respect to the second shaft being detected by change in magnetic flux passing through the first and second magnetism pickup path members when the first magnetism pickup path member located midway between the two adjacent fixed magnetic poles is displaced toward the fixed magnetic pole by torsional displacement of the first shaft with respect to the second shaft. The first magnetism pickup path members may be constituted by sixteen tooth profile projections fixed with respect to the first shaft.

DESCRIPTION OF THE PRIOR ART

In general, the number of devices and the like driven by a rotational drive force is very many, and the application field is widely spreaded. In the control of such devices, the control of torque is extremely important. That is, a torque is one of the most fundamental and significant parameters in controlling rotational drive systems, and if the information of torque and number of rotations is obtained, the occurrence condition and transmission condition of power can be grasped because the product of the torque and the number of rotations is proportional to a horse power.

There is described in Japanese patent laid-open publication No. 54-17228 a conventional torque sensor which is used in a steering force detecting device for detecting a steering force applied to a steering wheel of an automotive vehicle. In this device, the steering wheel and the steering shaft are coupled with each other through an elastic member, and a relative displacement of torsion caused between the steering wheel and the steering shaft by the torsion exerted on the elastic member in proportion to the magnitude of steering torque is detected by on-off operation of a contact interposed between the steering wheel and the steering shaft. In such a device are arranged contacts, microswitches and the like which are switched on and off by the relative torsional displacement, and therefore, the device has the disadvantages that arrangement of the contacts requires a highly accurate and elaborate technique and that it is difficult to establish individually the amount of relative torsional displacement at which the contact is switched on and the amount of relative torsional displacement at which the contact is switched off. In another conventional device described in Japanese patent laid-open publication No. 55-44013, an electrical displacement detecting means such as a strain gauge and the like is provided in an input shaft to which a steering torque is transmitted from the steering wheel, and a relative torsional displacement of the input shaft, which is caused by the difference between the steering torque transmitted to the input shaft and the steering resistance, is detected. However, since the electrical displacement detecting means such as a strain gauge and the like is secured to the input shaft to detect the torsional displacement of the input shaft, there were the disadvantages that the detecting means is subject to the influence of changes in temperature and not operated stably and reliably.

In order to eliminate these disadvantages, there have been proposed devices which are described in Japanese patent laid-open publication No. 58-194664, Japanese patent laid-open publication No. 58-218627, Japanese patent laid-open publication No. 58-105877, Japanese utility model laid-open publication No. 57-192872, Japanese utility model laid-open publication No. 58-5626 and Japanese patent laid-open publication No. 61-21861. For instance, in the device described in the aforementioned Japanese patent laid-open publication No. 58-194664, the column shaft connected at the one end thereof to the steering wheel and at the other end thereof to the steering gear is divided, the two divided shafts are provided in a steering device so that they are rotatably movable relative to each other, the relative rotational displacement of these two shafts is converted into a displacement of axial direction, and the steering force applied to the steering wheel by the magnitude of the axial displacement is detected. In addition, in the device described in the aforementioned Japanese patent laid-open publication No. 61-21861, a torsion of the torsion bar mechanism is converted into change in electrostatic capacity.

However, in the aforementioned conventional device wherein a relative rotational displacement is converted into an axial displacement, the conventional device wherein a torsion of the torsion bar mechanism is converted into change in electrostatic capacity and other devices, the torque sensors used therein are all torque sensors of a so-called contact type. The contact type torque sensor is structurally complex and requires a large number of mechanism and electrical parts and a considerably high accuracy in assembling. As a result, not only the cost of production is increased but also the accuracy of detection is degraded due to changes in temperature, humidity and the like. That is, since a torque is detected from a rotating shaft, the torque sensor is desired to be of a non-contact type from the standpoint of wear resisting performance, reliability and the like. On the other hand, the device shown in the aforementioned Japanese utility model publication No. 58-5626 is a torque sensor of the non-contact type, and the amount of torsional displacement is detected photoelectrically. However, the non-contact type torque sensor cannot be used in the place badly contaminated. In addition to the aforementioned disadvantages, in the conventional devices, it is extremely difficult to detect a displacement of rotational direction (that is, the direction in which the torque acts) and a static torque by the conventional torque sensor of the contact or non-contact type. That is, there has heretofore not been proposed a torque sensor which can eliminate the aforementioned disadvantages attendant with the prior art.

Thus, a torque sensor is extremely desired which is less expensive to manufacture and which is capable of detecting, with non-contact and precise, rotational and static torques which become a very important parameter in controlling rotational drive portions of engines, electric motors and the like.

It is, accordingly, an object of the present invention to provide an improved torque sensor of the non-contact type which is structurally simple, less expensive and has an excellent responsive performance and which is capable of detecting a torque independently of static or rotation.

BRIEF DESCRIPTION OF THE DRAWINGS

The features and advantages of the torque sensor according to the present invention will be more clearly understood from the following description in which like reference numerals and characters designate corresponding or similar members and structures throughout the figures of the drawings and in which:

FIG. 1 is an exploded perspective view of a first embodiment of the torque sensor in accordance with the present invention;

FIG. 2 is a longitudinal side view of the torque sensor shown in FIG. 1, a magnetism detecting element of the torque sensor having been removed from a first shaft the torsion of which is detected by the magnetism detecting element;

FIG. 3 is an end view of the torque sensor shown in FIG. 2, the magnetism detecting element being disposed between outer and inner rings without contacting with the first shaft;

FIG. 10 is a longitudinal side view of the torque sensor shown in FIG. 9, the two magnetism detecting elements having been removed from a first shaft the torsion of which is detected by the elements;

FIG. 11 is an end view of of the torque sensor shown in FIG. 10, the two magnetism detecting elements being disposed between outer and inner rings without contacting with the first shaft;

FIG. 16 is a view showing the eccentricity between the inner and outer rings caused by errors of assembly and the like;

FIG. 21 shows the effect which is obtained by the block diagram in FIG. 20;

FIG. 22 is an exploded perspective view of a fourth embodiment of the torque sensor in accordance with the present invention;

FIG. 23 is a longitudinal side view, partly in section, of the torque sensor shown in FIG. 22, a magnetism detecting element of the torque sensor having been removed from a first shaft the torsion of which is detected by the magnetism detecting element;

FIG. 24 is an end view showing the relative positions assumed by magnetic segments and tooth profile projections of a ring-shaped magnetic path member of FIG. 23 when torque is zero;

FIG. 25 is a perspective schematic view, partly broken away, showing the relative positions assumed by the magnetic segments and tooth profile projections when torque is zero;

FIG. 26 is a similar view to FIG. 25 showing the relative positions assumed by the magnetic segments and tooth profile projections when torque is applied in one direction;

FIG. 27 is a similar view to FIG. 25 showing the relative positions assumed by the magnetic segments and tooth profile projections when torque is applied in the other direction;

FIG. 31 is a schematic perspective view, partly broken away, showing the relative positions assumed by the magnetic segments and tooth profile projections when torque is zero;

FIG. 32 is a similar view to FIG. 31 showing the relative positions assumed by the magnetic segments and tooth profile projections when torque is applied in one direction;

FIG. 33 is a similar view to FIG. 31 showing the relative positions assumed by the magnetic segments and tooth profile projections when torque is applied in the other direction.

DESCRIPTION OF THE PREFERRED EMBODIMENTS

Figure 4:
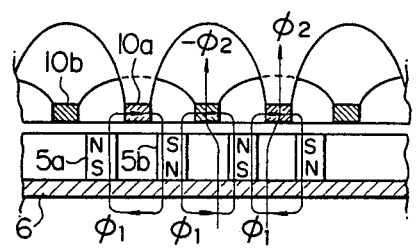
FIG. 4 is a part-sectional view, generally schematic in form, showing the relative positions assumed by magnetic segments and magnetic path segments of the torque sensor according to the first embodiment of the present invention when torque is zero.

Referring now in greater detail to the drawings and initially to FIGS. 1 and 2, there is shown a torque sensor 10 constructed in accordance with a first embodiment of the present invention. A first shaft designated by reference numeral 1 is connected through a small diameter portion 2 to a second shaft 3 so that a force of rotation of the first shaft 1 in the circumferential direction A or B indicated in FIG. 1 is transmitted through the small diameter portion 2 to the second shaft 3. That is, the fore end portion of the first shaft 1 is constructed such that a displacement of torsion thereof occurs. The small diameter portion 2 between the first and second shafts 1 and 3 is reduced in diameter to slightly reduce the torsional rigidity. A non-magnetic sleeve 4 surrounds the small diameter portion 2 and is secured to an outer surface 3a of the second shaft 3 through a hub portion 4a thereof, as clearly shown in FIG. 2. The non-magnetic sleeve 4 is formed at the end portion remote from the hub portion 4a with a magnetic segment embedding portion 4b of doughnut configuration. The non-magnetic sleeve 4 constitutes a torque detecting mechanism indicated generally by reference numeral 21 in cooperation with a pickup member 7 and a Hall element 13 which are to be described hereinafter. The magnetic segment embedding portion 4b of the non-magnetic sleeve 4 has an inner end face 4c which faces the first shaft 1 and which is substantially perpendicular to the axial direction of the first and second shafts 1 and 3. The magnetic segment embedding portion 4b is provided with a plurality of first magnetic segments 5a and a second magnetic segments 5b which are alternatively arranged equiangularly with respect to the center axis of the magnetic segment embedding portion 4b. Each of the first magnetic segments 5a has a N-pole at the inner end face 4c as a fixed magnetic pole, while each of the second magnetic segments 5b has a S-pole as a fixed magnetic pole at the inner end face 4c. Thus, the first and second segments 5a and 5b are secured to the second shaft 3 so that the first and second magnetic segments 5a and 5b surround the small diameter portion 2 of the first shaft 1 and are alternatively arranged around the small diameter portion 2. In this embodiment, the first magnetic segments 5a comprise eight magnetic segments and the second magnetic segments 5b comprise eight magnetic segments. The end portions of the first and second magnetic segments 5a and 5b remote from the inner end face 4c are connected to a circular common disc 6. The common disc 6 forms a part of magnetic paths of closed loop configuration which are formed by magnetic fields generated from the first and second magnetic segments 5a and 5b. The common disc 6 and the first and second magnetic segments 5a and 5b are embedded in and formed integrally with the magnetic segment embedding portion 4b of the sleeve 4. While the first embodiment of the present invention has been described in conjunction with eight first magnetic segments 5a and eight second magnetic segments 5b, it is noted that it is not limited to the eight first and second magnetic segments if they are alternatively arranged.

The pickup member 7 of non-magnetic material forming a part of the torque detecting mechanism 21 is fixed on an outer surface 1a of the first shaft 1 so that it is spaced from the inner end face 4c of the magnetic segment embedding portion 4b to form a narrow interstice therebetween. The pickup member 7 has an outer end face 7a to which are attached an outer ring 8 and an inner ring 9 surrounded by the outer ring 8. The pickup member 7 further has an inner end face 7b facing the inner end face 4c of the magnetic segment embedding portion 4b. On the inner end face 7b of the pickup member 7 are arranged a plurality of first magnetic path segments or members 10a and second magnetic path segments or members 10b corresponding in number to the first and second magnetic segments 5a and 5b, respectively. The first and second magnetic path segments 10a and 10b become magnetic paths, respectively, when subjected to magnetic forces generated from the magnetic segments 5a and 5b. The first and second magnetic path segments 10a and 10b are alternatively arranged equiangularly with respect to the center axis of the pickup member 7. The first magnetic path segments 10a are connected to the outer ring 8, while the second magnetic path segments 10b are connected to the inner ring 9. The first magnetic path segment 10a and the outer ring 8 constitute a first magnetism pickup path member designated generally by reference numeral 11 (FIG. 7), and the second magnetic path segment 10b and the inner ring 9 constitute a second magnetism pickup path member designated generally by reference numeral 12. It is preferable that the common disc 6, magnetic path segments 10a and 10b, outer ring 8 and inner ring 9 be made of material easily permeable to a line of magnetic force, for example, permalloy, ferrite and the like. The magnetic forces generated from the first and second magnetic segments 5a and 5b are induced through the first and second magnetic path segments 10a and 10b in the outer ring 8 and the inner ring 9. The first and second magnetic path segments 10a and 10b are integrally formed in the pickup member 7 of non-magnetic material, and arranged so that each of first or second magnetic path segments 10a and 10b is located midway between the two adjacent first and second magnetic segments 5a and 5b when the torque is zero, as clearly shown in FIG. 3.

Thus, a plurality of the first magnetism pickup path members 11 (10a, 8) and second magnetism pickup path members 12 (10b, 9) correspond in number to the N-pole of the first magnetic segments 5a and the S-pole of the second magnetic segments 5b, respectively, the first and second pickup path members being alternatively arranged so that each path member faces two adjacent first and second magnetic segments and is located midway between the two adjacent first and second magnetic segments.

Consequently, when the torque is zero, a first gap space $L_a$ (FIG. 7) from the first magnetic segment 5a to the first magnetic path segment 10a and a second gap space $L_b$ (FIG. 7) from the first magnetic segment 5a to the second magnetic path segment 10b are equal to each other. Likewise, a first gap space $L_a$ from the second magnetic segment 5b to the second magnetic path segment 10b is equal to a second gap space $L_b$ from the second magnetic segment 5b to the first magnetic path segment 10a. As a result, as the first shaft 1 is rotated in the circumferential direction A or B of the first shaft 1, the gap spaces $L_a$ and $L_b$ are varied in proportion to the rotation of the first shaft 1.

The aforementioned hole element 13 (magnetism detecting element) forming a part of the torque detecting mechanism 21 is interposed between the outer and inner rings 8 and 9 without contacting with them and perpendicular to the magnetic field from the outer ring 8 to the inner ring 9 (or from the inner ring 9 to the outer ring 8). That is, the magnetism detecting element 13 is provided in the first shaft 1 so that it does not contact with said first shaft 1. The magnetism detecting element 13 is adapted for detecting change in magnetic flux passing through the first and second magnetism pickup path members 11 (10a, 8) and 12 (10b, 9). The displacement of torsion of the first shaft 1 with respect to the second shaft 3 is detected by change in magnetic flux passing through said first and second magnetism pickup path members 11 and 12 when the N-pole of the first magnetic segment 5a is displaced toward the first or second magnetism pickup path member 11 and 12 by torsional displacement of the first shaft 1 with respect to the second shaft 3. The magnetism detecting element 13 is bonded to a print board 14 which has mounted thereon members (not shown) for detecting and processing signals from the magnetism detecting element 13. The print board 14 is freely rotatably mounted through a hub portion 14a thereof on the first shaft 1. The magnetism detecting element 13 is a sensor which utilizes a Hall effect and generates output voltage in proportion to the magnitude of magnetic field, and since the magnetism detecting element itself is well known, the description thereof will hereinafter be omitted.

The operation of the torque sensor thus constructed and arranged in accordance with the first embodiment of the present invention will hereinafter be described in detail.

In the torque sensor according to the present invention, in detecting the magnetic forces generated from the first and second magnetic segments 5a and 5b by the element 13, the mechanical torsional displacement between the first and second shafts 1 and 3 is converted into changes of the gap spaces $L_a$ and $L_b$ between the magnetic segments 5a, 5b and the magnetic path segments 10a, 10b, and changes in a flow of magnetic flux and in an amount of magnetic flux caused by the changes of the gap spaces $L_a$ and $L_b$ are detected by the element 13, and as a result the torque is detected.

Figure 7:
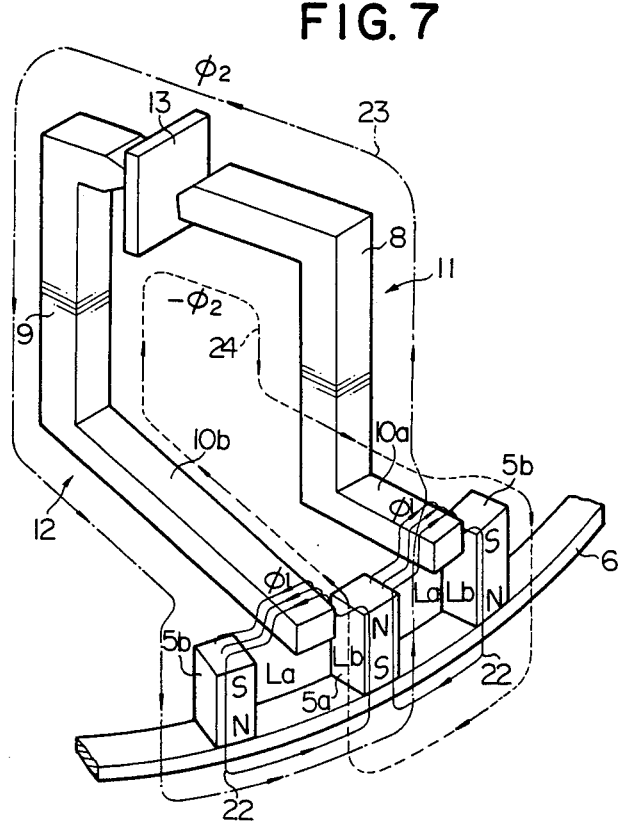
FIG. 7 is an enlarged diagrammatic perspective view, partly broken away, showing a torque detecting mechanism according to the first embodiment of the present invention.

In the case that the torque is zero (FIGS. 4 and 7), the gap space $L_a$ from the first magnetic segment 5a to the first magnetic path segment 10a and the gap space $L_b$ from the first magnetic segment 5a to the second magnetic path segment 10b are equal to each other, and the relationship of location between the magnetic segment and the magnetic path segment is equal at any positions. In FIG. 7, the magnetic flux generated from the N-pole of the first magnetic segment 5a, as indicated by arrows of solid lines, enters the first magnetic path segment 10a through the gap space $L_a$, and passes through the fore end portion of the first magnetic path 10a and reaches the S-pole of the second magnetic segment 5b through the gap space $L_b$. Similarly, the magnetic flux generated from the N-pole of the first magnetic segment 5a, on the other hand, enters the second magnetic path segment 10b through the gap space $L_b$, and passes through the fore end portion of the second magnetic path segment 10b and reaches the S-pole of the second magnetic segment 5b through the gap space $L_a$. The magnetic flux generated from the N-pole of the second magnetic segment 5b reaches the S-pole of the first magnetic segment 5a through the common disc 6. In this way, the magnetic segments 5a, 5b, magnetic path segment 10a (or 10b) and common disc 6 form one main magnetic path 22 of closed loop configuration in cooperation with the gap spaces $L_a$ and $L_b$. The magnetic flux of the main magnetic path 22 is indicated by $\phi_1$.

On the other hand, the magnetic flux generated from the N-pole of the first magnetic segment 5a not only forms the aforementioned main magnetic path 22 between the first and second magnetic segments 5a and 5b but also flows to the axial directions of the first and second magnetic path segments 10a and 10b. That is to say, as shown by arrows of a dotted line in FIG. 7, a part of the the magnetic flux generated from the N-pole of the first magnetic segment 5a enters the first magnetism pickup path member 11 consisting of the first magnetic path 10a and the outer ring 8 through the gap space $L_a$ and reaches the S-pole of the second magnetic segment 5b through the element 13, second magnetism pickup path member 12 consisting of the outer ring 9 and the second magnetic path segment 10b and through gap space $L_a$, and returns to the S-pole of the first magnetic segment 5a through the N-pole of the second magnetic segment 5b and common disc 6. In this way, the part of the the magnetic flux generated from the N-pole of the first magnetic segment 5a forms a first bypass magnetic path 23 the magnetic flux of which is indicated by $\phi_2$. Furthermore, the magnetic force generated at the N-pole of the first magnetic segment 5a forms a second bypass magnetic path 24 which is opposite in polarity to the first bypass magnetic path 23 and which enters the second magnetism pickup path member 12 through the gap space $L_b$ and reaches the S-pole of the second magnetic segment 5b through the element 13, first magnetism pickup path member 11, and the gap space $L_a$ and returns to the S-pole of the first magnetic segment 5a through the N-pole of second magnetic segment 5b and common disc 6. The magnetic flux of the second bypass path 24 is indicated by $-\phi_2$. The strength of magnetic flux impressed to the element 13 is determined by the magnitude of the gap space $L_a$ or $L_b$ which is extremely small in magnetic permeability as compared with the common disc 6 or magnetic path material of large magnetic permeability. Each of the magnetic path segments 10a, 10b, outer ring 8, inner ring 9 and common disc 6 forms a common magnetic path both at the time the torque is zero and at the time the torque is applied, and therefore, even if they are degraded due to secular change and the like, a detection accuracy of torque would not be reduced.

Thus, in the case that the torque is zero, the magnetic flux $\phi_1$ in the main magnetic path 22 is extremely larger than the magnetic flux $\phi_2$ in the first bypass path 23 and the absolute value of the magnetic flux $-\phi_2$ in the second bypass path 24, and therefore the magnetic flux does not almost enter the first and second bypass paths 23 and 24 wherein the element 13 is provided. In addition, since the gap spaces $L_a$ and $L_b$ are equal to each other, even if a part of the magnetic flux passes through the bypass paths 23 and 24, the magnetic flux $\phi_2$ in the first bypass path 23 and the magnetic flux $-\phi_2$ in the second bypass path 24 will be equal in magnitude to each other. Consequently, they are cancelled with each other and the torque is not detected by the element 13. It should be noted that in this embodiment, change in the magnetic flux of the bypass magnetic paths 23 and 24 is detected. That is to say, the element 13 is provided in the bypass magnetic paths 23 and 24. On the other hand, although the magnetic flux in the main magnetic path 22 is changed by the variation of torque, the change is not detected. However, the torque is capable of being detected by the change in the magnetic flux of the main magnetic path 22. In this embodiment, the operation of the torque sensor according to the present invention will hereinafter be described in conjunction with the change in magnetic flux of the bypass magnetic paths 23 and 24.

Figure 5:
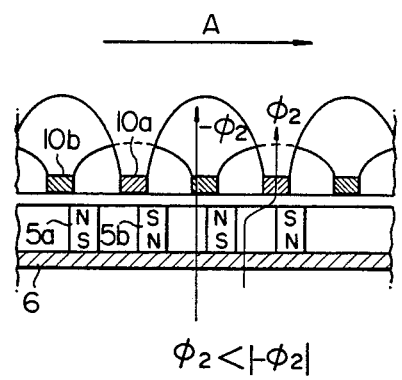
FIG. 5 is a similar view to FIG. 4 showing the relative positions assumed by the magnetic segments and magnetic path segments when torque is applied in one direction.
Figure 8:
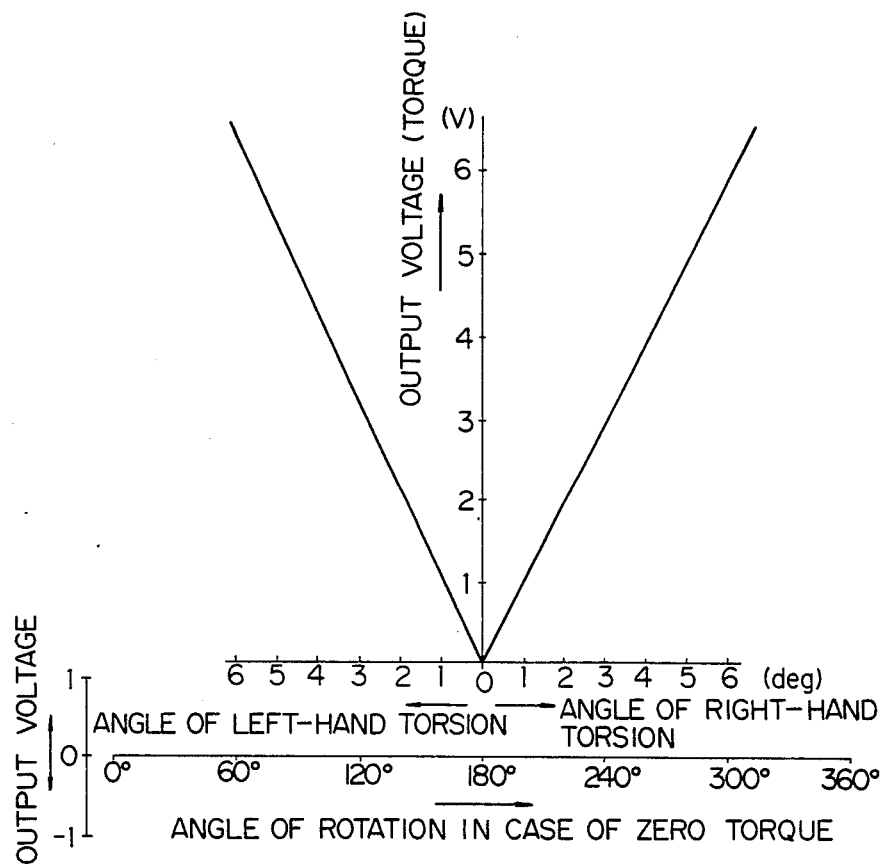
FIG. 8 shows a torque characteristic of the torque detecting mechanism shown in FIG. 7.

In the case that the torque is applied in the direction A as shown in FIG. 5, both the gap space $L_a$ from the first magnetic segment 5a to the first magnetic path segment 10a and the gap space $L_a$ from the second magnetic segment 5b to the second magnetic path segment 10b increase, and on the contrary, both the the gap space $L_b$ from the first magnetic segment 5a to the second magnetic path segment 10b and the gap space $L_b$ from the second magnetic segment 5b to the first magnetic path segment 10a decrease. Consequently, the magnetic flux $-\phi_2$ of the second bypass magnetic path 24 decreases in resistance of magnetic path, while the magnetic flux $\phi_1$ of the main magnetic path 22 increases in resistance of magnetic path. As a result, the flow of the magnetic flux transfers from the main magnetic path 22 toward the second bypass magnetic path 24, and the magnetic flux $-\phi_2$ becomes larger than the magnetic flux $\phi_2$ in proportion to the magnitude of the angle of torsion in the direction A (FIG. 8). For example, if the direction in which the magnet field is impressed to the element 13 by the torque applied in the direction A is a plus direction and the output voltage of the element 13 is adjusted to be a plus value, the magnitude and direction of the torque generated and the static torque can be detected suitably as shown in FIG. 8.

Figure 6:
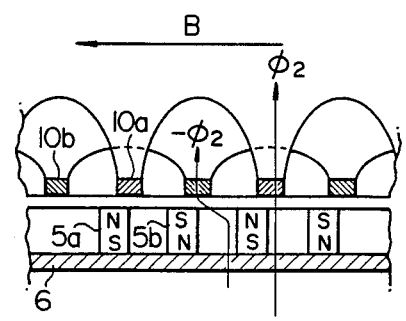
FIG. 6 is a similar view to FIG. 4 showing the relative positions assumed by the magnetic segments and magnetic path segments when torque is applied in the other direction.

In the case that the torque is applied in the direction B as shown in FIG. 6, the magnetic flux $\phi_2$ of the first bypass magnetic path 23 becomes larger than the magnetic flux $-\phi_2$ of the second bypass magnetic path 24, and the torque can be detected in the opposite direction to the above case that the torque is applied in the direction A.

Thus, in this embodiment, in detecting magnetic forces generated from the magnetic segments 5a and 5b by the element 13, the torsional displacement between the first and second shaft 1 and 3 is converted into changes of the gap spaces $L_A$ and $L_B$ between the magnetic segments 5a and 5b and the magnetic path segments 10a and 10b. The changes of the gap spaces $L_A$ and $L_B$ are precisely detected as changes in the magnitude of magnetic flux by the element 13 provided without contacting with the first shaft 1. Accordingly, as compared with the aforementioned conventional torque sensors, there is provided an improved torque sensor of the non-contact type which is structurally simple, less expensive and has an excellent responsive performance. Also, in addition to simple construction, since the element 13 can be adjusted after the non-magnetic sleeve 4 and pickup member 7 are assembled, the torque sensor according to the present invention does not require a highly accurate and elaborate technique for assembling these members. Furthermore, since a rotational torque is detected without contacting in accordance with the present invention, not only wear resisting performance, reliability and like can be extremely enhanced but also a static torque can be precisely detected. Although, in this embodiment, a rotational torque is detected between rotational angles of $+6°$ and $-6°$ (FIG. 8), it is noted that static and rotation torques of a wide range can be also detected by adjusting, for example, magnetic segments, magnetic path segments and torsional rigidity of shaft. Furthermore, although the first and second shaft 1 and 3 are formed by one integral member, it is noted that they may be also formed by different members, respectively.

Figure 9:
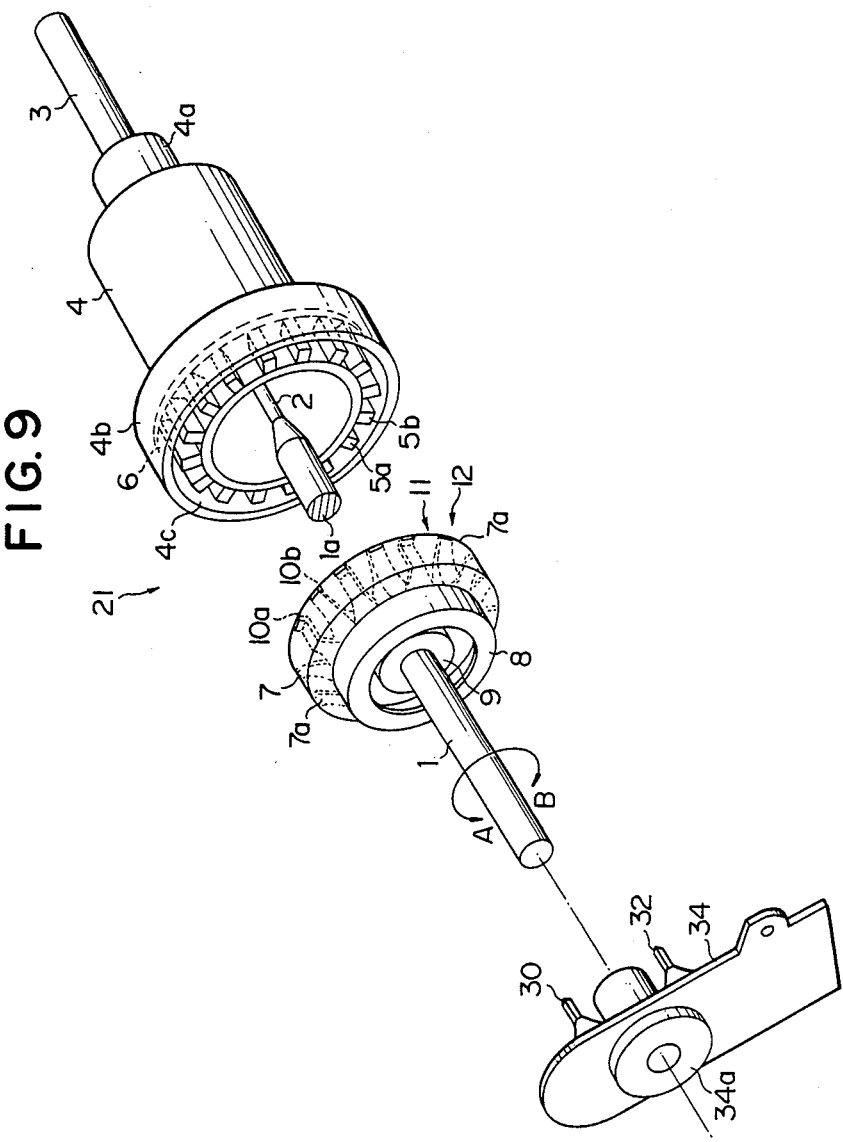
FIG. 9 is an exploded perspective view of a second embodiment of the torque sensor in accordance with the present invention, two Hall elements being used as a magnetism detecting element of the torque sensor.

Referring to FIGS. 9, 10 and 11, there is shown another torque sensor constructed in accordance with a second embodiment of the present invention. This embodiment is substantially identical to the aforementioned first embodiment of the present invention except that a first Hall element (first magnetism detecting element) 30 and a second Hall element (second magnetism detecting element) 32 are provided therein. Therefore, the members and structures corresponding to those of the aforementioned first embodiment of the present invention are designated by like reference numerals to avoid the description thereof.

The first element 30 and the second element 32 are spaced apart 180 degrees with respect to a first shaft 1. The first and second elements 30 and 32 are interposed between outer and inner rings 8 and 9 without contacting with the first shaft 1 and disposed perpendicularly with respect to the magnetic field from the outer ring 8 to the inner ring 9 (or from the inner ring 9 to the outer ring 8). The first and second elements 30 and 32 are bonded to a print board 34 which has mounted thereon means (not shown) for detecting and processing signals from the first and second elements 30 and 32. The print board 34 is freely rotatably mounted on the first shaft 1 through a hub portion 34a of the print board 34. Each of the first and second elements 30 and 32 is a sensor which utilizes a Hall effect solid and generated an output voltage in proportion to the magnitude of magnetic field, and since the element itself is well known, the description thereof will hereinafter be omitted.

Figure 12:
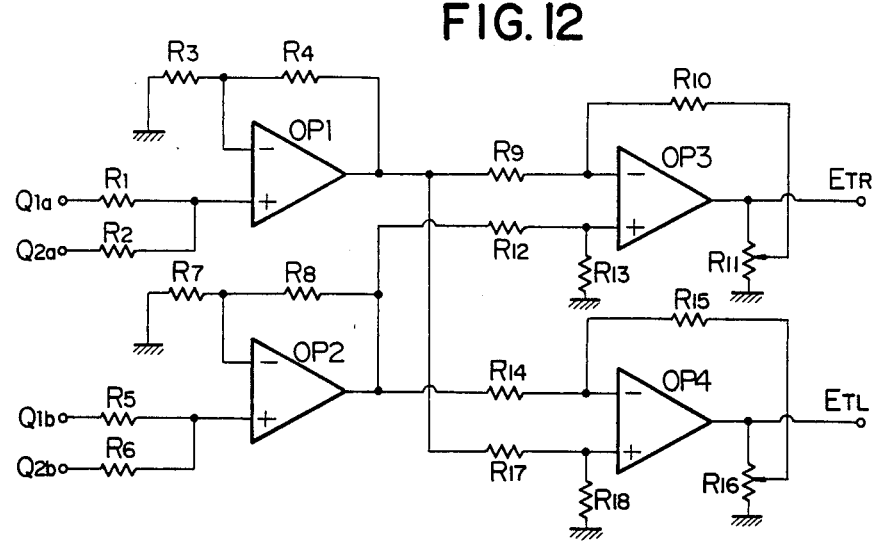
FIG. 12 is a diagram showing an operational or arithmetic unit by which outputs of the two Hall elements are detected as an amount of torque.
Figure 13:
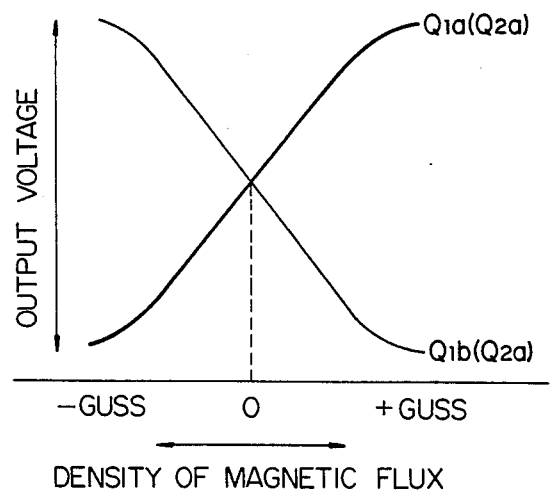
FIG. 13 shows torque characteristics of the two magnetism detecting elements with the output voltage taken on the ordinate and with the density of magnetic flux taken on the abscissa.
Figure 14:
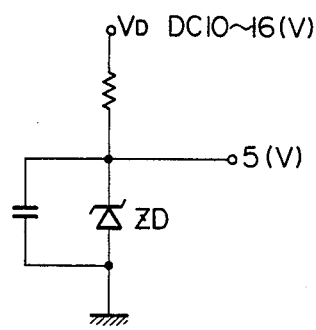
FIG. 14 is a diagrammatic view showing a constant-voltage circuit from which a power voltage of 5 (V) is supplied to non-reversing amplifiers of the operational unit shown in FIG. 12.
Figure 15:
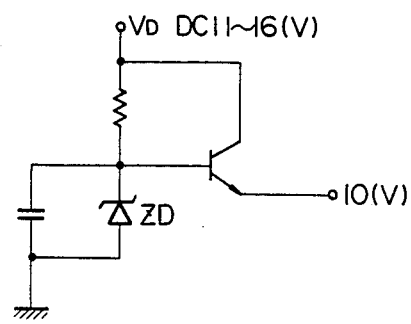
FIG. 15 is a diagrammatic view showing a constant-voltage circuit from which a power voltage of 10 (V) is supplied to differential amplifiers of the operational unit shown in FIG. 12.

FIG. 12 shows an operational or arithmetic unit by which the outputs of the first and second elements 30 and 32 are detected as an amount of torque. In the operational unit, non-reversing amplifiers are designated by OP1 and OP2, differential amplifiers are designated by OP3 and OP4, and resistors are designated by $R_1$ through $R_{18}$. The first element 30 outputs a plus output voltage $Q_{1a}$ when magnetic field is applied from the outer ring 8 to the inner ring 9 and a minus output voltage $Q_{1b}$ when magnetic field is applied from the inner ring 9 to the outer ring 8. Likewise, the second element 32 outputs a plus output voltage $Q_{2a}$ when magnetic field is applied from the outer ring 8 to the inner ring 9 and a minus output voltage $Q_{2b}$ when magnetic field is applied from the inner ring 9 to the outer ring 8 (see FIG. 13). To the non-reversing amplifiers OP1 and OP2 is supplied a power voltage of 5 (V) from a constant-voltage circuit as shown in FIG. 14, and to the differential amplifiers OP3 and OP4 is supplied a power voltage of 10 (V) from a constant-voltage circuit as shown in FIG. 15. The non-reversing amplifier OP1 has a first or plus input terminal which is connected to the plus output voltage $Q_{1a}$ through the resistor $R_1$ and to the plus output voltage $Q_{2a}$ through the resistor $R_2$ arranged in parallel with the resistor $R_1$. The non-reversing amplifier OP2 has a first or plus input terminal which is connected to the minus output voltage $Q_{1b}$ through the resistor $R_5$ and to the minus output voltage $Q_{2b}$ through the resistor $R_6$ arranged in parallel with the resistor $R_5$. Consequently, the non-reversing amplifier OP1 forms an addition circuit of the plus output voltages $Q_{1a}$ and $Q_{2a}$, and the non-reversing amplifier OP2 forms an addition circuit of the minus output voltages $Q_{1b}$ and Q$_{2b}$. The non-reversing amplifier OP1 further has an output terminal which is connected to a second or minus input terminal of the differential amplifier OP3 through the resistor R$_9$ and to a first or plus input terminal of the differential amplifier OP4 through the resistor R$_{17}$. Likewise, the non-reversing amplifier OP2 has an output terminal which is connected to the first input terminal of the differential amplifier OP3 through the resistor R$_{12}$ and to a second or minus input terminal of the differential amplifier OP4 through the resistor R$_{14}$. The resistor R$_3$ is connected at one end thereof to the ground and at the other end thereof to a second or minus input terminal of the non-reversing amplifier OP1. The resistor R$_4$ is connected at one end thereof to the resistor R$_3$ and at the other end thereof to the output terminal of the non-reversing amplifier OP1. Likewise, the resistor R$_7$ is connected at one end thereof to the ground and at the other end thereof to a second or minus input terminal of the non-reversing amplifier OP2, and the resistor R$_8$ is connected at one end thereof to the resistor R$_7$ and at the other end thereof to the output terminal of the non-reversing amplifier OP2. The resistor R$_{10}$ is connected at one end thereof to the second input terminal of the differential amplifier OP3 and at the other end thereof to the resistor R$_{11}$ which is connected at one end thereof to an output terminal of the differential amplifier OP3 and at the other end thereof to the ground. Likewise, the resistor R$_{15}$ is connected at one end thereof to the second input terminal of the differential amplifier OP4 and at the other end thereof to the resistor R$_{16}$ which is connected at one end thereof to an output terminal of the differential amplifier OP4 and at the other end thereof to the ground. The resistor R$_{13}$ is connected at one end thereof to the first input terminal of the differential amplifier OP3 and at the other end thereof to the ground, and the resistor R$_{18}$ is connected at one end thereof to the first input terminal of the differential amplifier OP4 and at the other end thereof to the ground. The resistance values of the resistors R$_3$, R$_4$, R$_7$, R$_8$, R$_9$, R$_{10}$, R$_{11}$, R$_{12}$, R$_{13}$, R$_{14}$, R$_{15}$, R$_{16}$, R$_{17}$ and R$_{18}$ determine the operating state of the non-reversing amplifiers OP1 and OP2 and the differential amplifiers OP3 and OP4, and each resistance value is determined so that the non-reversing amplifiers OP1 and OP2 are substantially equal to each other in operating characteristic or the differential amplifiers OP3 and OP4 are substantially equal to each other in operating characteristic. In the case that the differential between the outputs from the the non-reversing amplifiers OP1 and OP2 is a plus quantity, the differential amplifier OP3 outputs from the output terminal thereof an output voltage E$_{TR}$ indicating that the torque is applied in the direction of right hand screw. On the other hand, in the case that the differential between the outputs from the the non-reversing amplifiers OP1 and OP2 is a minus quantity, the differential amplifier OP4 outputs from the output terminal thereof an output voltage E$_{TL}$ indicating that the torque is applied in the direction of left hand screw.

The operation of the torque sensor in accordance with the second embodiment of the present invention will hereinafter be described.

In detecting the magnetic forces generated from first and second magnetic segments 5$a$ and 5$b$ by the first and second elements 30 and 32, the mechanical torsional displacement between the first and second shafts 1 and 3 is converted into changes of gap spaces L$_a$ and L$_b$ between magnetic segments 5$a$, 5$b$ and magnetic path segments 10$a$, 10$b$, and changes in a flow of magnetic flux and in an amount of magnetic flux caused by the changes of the gap spaces L$_a$ and L$_b$ are detected by the first and second elements 30 and 32 without contacting, and as a result the torque is detected.

In the case that the torque is zero and that the torque is applied in the circumferential direction A or B of the first shaft 1, the operation of the torque sensor according to the second embodiment of the present invention is substantially identical to that of the aforementioned first embodiment of the present invention except that the output of the second element 32 is different in phase of 180 degrees from the output of the first element 30, and therefore the operation will hereinafter be omitted.

Figure 16:
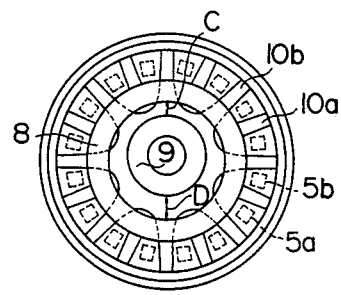
Figure 17:
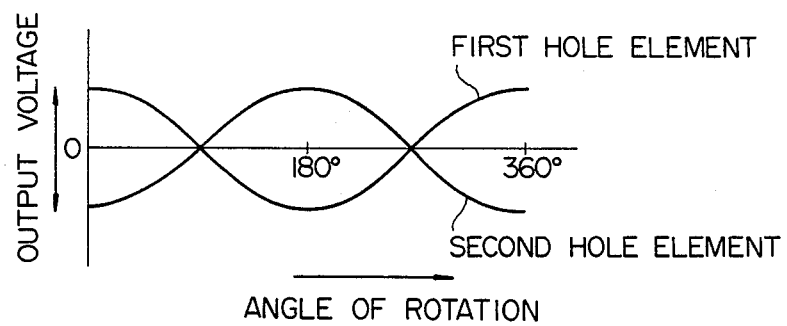
FIG. 17 is a schematic view showing torque ripples which are caused by the eccentricity as shown in FIG. 16.
Figure 18:
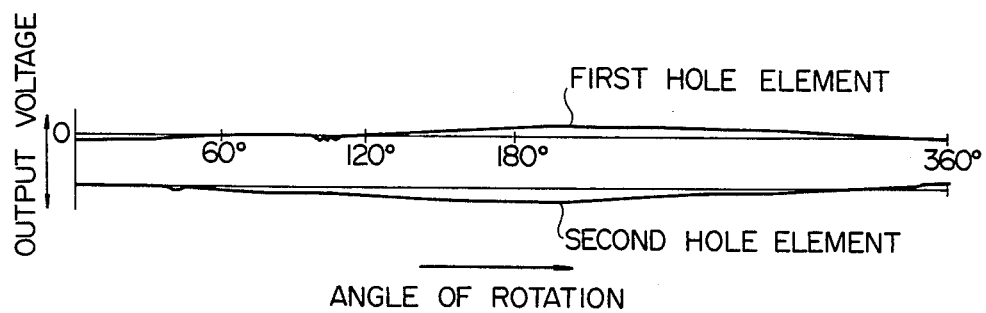
FIG. 18 is a view showing output voltages of the Hall elements which are detected with respect to angles of rotation in the case that there is the eccentricity as shown in FIG. 16.

As stated above, the two elements 30 and 32 spaced apart 180 degrees with respect to the center axis of the first shaft 1 are provided in the second embodiment of the present invention. Consequently, in addition to the effect obtained by the first embodiment, the second embodiment is advantageous in that even in the case that a radial gap C (FIG. 16) and a radial gap D (FIG. 16) between the outer and inner rings 8 and 9 are different from each other due to errors of assembly and the like, torque can be suitably detected by the two elements 30 and 32 different in phase. That is to say, even if torque ripples of the first and second elements 30 and 32, as shown in FIG. 17, occur every one revolution due to eccentricity and the like caused by the errors of assembly and the like, the torque ripples are cancelled with each other, so that the torque is detected suitably. Accordingly, not only a accuracy of detection is considerably enhanced but a torque is detected suitably even if an eccentricity of shaft occurs or one of two hole elements is damaged. As shown in FIG. 18, which is a view showing output voltages of the elements 30 and 32 which are detected with respect to angles of rotation in the case that there is the eccentricity between the inner and outer rings 9 and 8, the torque ripples caused by the eccentricity are cancelled in this embodiment by the operational unit as shown in FIG. 12. Although the operational unit is shown as a unit for detecting a rotational torque, it is noted that it may be of other types of units by which torque ripples are cancelled with each other. While the second embodiment of the present invention has been described in conjunction with two Hall elements 30 and 32 spaced 180 degrees to correct eccentricity, it is noted that it may be also applied to more than two Hall elements.

Figure 19:
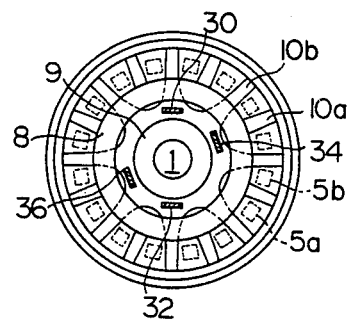
FIG. 19 is a front view of another torque sensor according to a third embodiment of the present invention, four Hall elements being used as a magnetism detecting element of the torque sensor.
Figure 20:
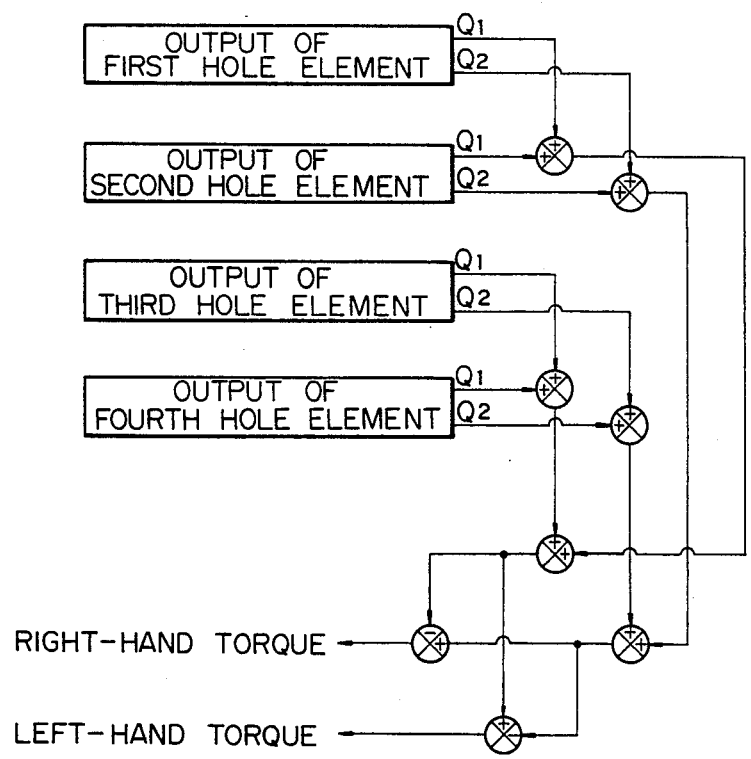
FIG. 20 is a block diagram of the torque sensor shown in FIG. 19.
Figure 28:
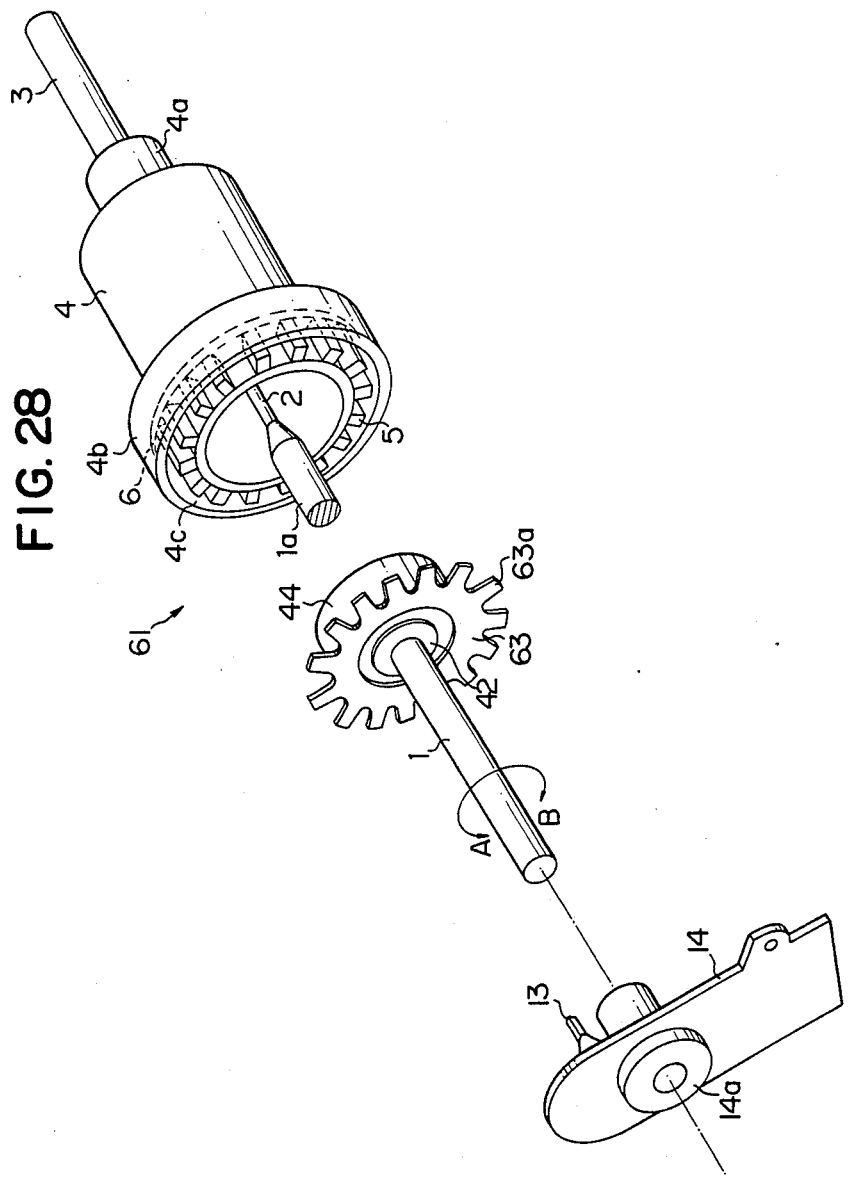
FIG. 28 is an exploded perspective view of a fifth embodiment of the torque sensor in accordance with the present invention.
Figure 29:
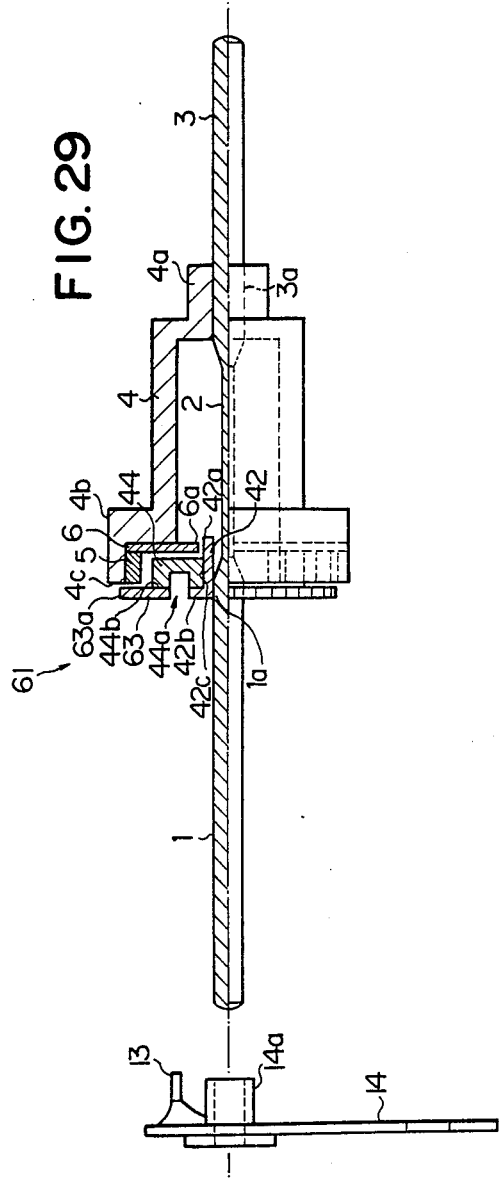
FIG. 29 is a longitudinal sectional side view, partly in section, of the torque sensor shown in FIG. 28, a magnetism detecting element of the torque sensor having been removed from a first shaft the torsion of which is detected by the magnetism detecting element.
Figure 30:
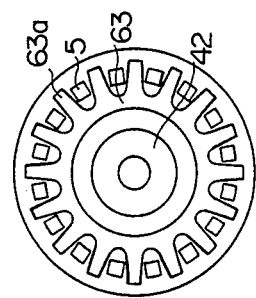
FIG. 30 is an end view of the relative positions assumed by magnetic segments and tooth profile projections of a ring-shaped magnetic path member of FIG. 29 when torque is zero.

Referring to FIGS. 19, 20 and 21, there is shown a third embodiment in accordance with the present invention. The third embodiment is substantially identical to the aforementioned second embodiment of the present invention except that a first Hall element (first magnetism detecting element) 30, a second Hall element (second magnetism detecting element) 32, a third Hall element (third magnetism detecting element) 34, a fourth Hall element (fourth magnetism detecting element) 36 are provided. Therefore, the members and structures corresponding to those of the aforementioned second embodiment of the present invention are designated by like reference numerals to avoid the description thereof. Although the first and second magnetism detecting elements in the second embodiment are all used to correct the eccentricity, in the third embodiment, the first, second and fourth magnetism detecting elements are used to correct the eccentricity and the third magnetism detecting element is used to correct unevenness in density of magnetic flux.

In FIG. 19, the first and second elements 30 and 32 are spaced apart 180 degrees with respect to the center axis of a first shaft 1, and the third and fourth elements 34 and 36 are also spaced apart 180 degrees with respect to the center axis of the first shaft 1. The elements 30, 32, 34 and 36 are connected as shown in a block diagram of FIG. 20. Consequently, when magnetic flux flows to magnetic path segments 10a and 10b from magnetic segments 5a and 5b, even if the magnetic flux is uneven in density between a gap $L_a$ from the magnet segment 5a to the magnetic path segment 10a and a gap $L_b$ from the magnetic segment 5a to the magnetic path segment 10b because of uneven arrangement of the segments 5a, 5b, 10a and 10b, the uneven magnetic flux can be averaged, as shown in FIG. 21, by the third element 34. Accordingly, in addition to the effect of the second embodiment, the third embodiment is capable of correcting the uneven magnetic flux resulting from the arrangement of the segments 5a, 5b, 10a and 10b. Thus, in this embodiment, an accuracy of detection is further considerably enhanced. The fourth element 36 is substantially identical in construction and operation to the second element 32 of the second embodiment of the present invention.

Referring to FIGS. 22, 23 and 24, there is shown another torque sensor constructed in accordance with a fourth embodiment of the present invention. This embodiment is substantially identical to the aforementioned first embodiment of the present invention except that a cylindrical magnetic path member 42, a pickup member 44 and a ring-shaped magnetic path member 46 are different from the inner ring 9, the pickup member 7 and the outer ring 8 of the first embodiment of the present invention, respectively. Therefore, the members and structures corresponding to those of the aforementioned first embodiment of the present invention are designated by like reference numerals to avoid the description or detailed description.

In FIG. 23, the cylindrical second magnetic path member 42 is fixedly mounted on an outer surface 1a of a first shaft 1 adjacent a small diameter portion 2 between the first shaft and a second shaft 3. The cylindrical magnetic path member 42 has a cylindrical portion 42a which axially extends through an inner surface 6a of a common disc 6 to form a very narrow annular gap (pivot air gap) therebetween and toward the second shaft 3. The cylindrical magnetic path member 42 further has a radial flange portion 42b which is opposed to an inner surface 46b of the ring-shaped magnetic path member 46 so that an annular space is formed therebetween. On an outer surface 42c of the cylindrical portion 42a of the cylindrical magnetic path member 42 is fixedly mounted the pickup member 44 of non-magnetic material. The pickup member 44 constitutes a torque detecting mechanism designated generally by reference numeral 41 in cooperation with a Hall element 13 and a sleeve member 4 formed with a plurality of pairs of first magnetic segment 5a having a N-pole as a fixed magnetic pole and second magnetic segment 5b having a S-pole as a fixed magnetic pole, the first and second segments 5a and 5b being secured to the second shaft 3 so that the pairs of said first and second magnetic segments 5a and 5b surround the small diameter portion 2 of the first shaft 1. The pickup member 44 is formed with an annular groove 44a which is open to the annular space between the radial flange portion 42b of the cylindrical magnetic path member 42 and the inner surface 46b of the ring-shaped magnetic path member 46. The pickup member 44 has the magnetic path member 46 mounted on an outer annular end face 44b thereof. The magnetic path member 46 is formed with a plurality of tooth profile projections 46a corresponding in number to the pairs of the first magnetic segment 5a and second magnetic segment 5b. Each tooth profile projection 46a is arranged so that it faces two adjacent N-pole and S-pole of the fixed magnetic poles and is located midway between the two adjacent N-pole and S-pole. In this embodiment, the tooth profile projections 46a comprise eight tooth profile projections. The tooth profile projections 46a constitute first magnetism pickup path members, while the cylindrical magnetic path member 42 constitutes a second magnetism pickup path member. As shown in FIG. 24, the N-pole of the first magnetic segment 5a and the S-pole of the second magnetic segment 5b are located on the right side and left side of the tooth profile projection 46a, respectively. It should be noted that the S-pole may be located on the right side and the N-pole may be located on the left side. A first space gap $L_a$ from the N-pole to the tooth profile projection 46a is equal to a second space gap $L_b$ from the S-pole to the tooth profile projection 46a. As a result, as the first shaft 1 is rotated in the circumferential direction A or B of the first shaft 1, the first and second gap spaces $L_a$ and $L_b$ are varied. The aforementioned element 13 (magnetism detecting element) forming a part of the torque detecting mechanism 41 extends in the annular space between the radial flange portion 42b of the cylindrical magnetic path member 42 and the inner surface 46b of the ring-shaped first magnetic path member 46 and in the annular groove 44a formed in the pickup member 44, so that the element 13 does not contact with the magnetic path members 42, 46 and pickup member 44. The element 13 is disposed perpendicularly with the respect to the magnetic field from the tooth profile projections 46a to the radial portion 42b of the cylindrical magnetic path member 42 or the magnetic field from the radial portion 42b to the tooth profile projections 46a. The element 13 is bonded to a print board 14 which has mounted thereon means (not shown) for detecting and processing signals from the element 13.

The operation of the torque sensor in accordance with the fourth embodiment of the present invention will hereinafter be described in detail.

The mechanical torsional displacement between the first and second shafts 1 and 3 is converted into changes of the gap space $L_a$ between the N-pole of the first magnetic segment 5a and the tooth profile projection 46a and of the space gap $L_b$ between the S-pole of the second magnetic segment 5b and the tooth profile projection 46a, and changes in a flow of magnetic flux and in an amount of magnetic flux caused by the changes of the gap spaces $L_a$ and $L_b$ are detected by the element 13 without contacting, and as a result the torque is detected.

As shown in FIG. 25, in the case that the torque is zero, the gap space $L_a$ from the first magnetic segment 5a to the tooth profile projection 46a and the gap space $L_b$ from the tooth profile projection 46a to the second magnetic segment 5b are equal to each other. The magnetic flux generated from the N-pole of the first magnetic segment 5a, as indicated by arrows of solid lines, enters the tooth profile projection 46a through the gap space $L_a$, and passes through the tooth profile projection 46a and reaches the S-pole of the second magnetic segment 5b through the gap space $L_b$. The magnetic flux generated from the N-pole of the second magnetic segment 5b reaches the S-pole of the first magnetic segment 5a through the common disc 6. In this way, the magnetic segments 5a, 5b, tooth profile projection 46a of the ring-shaped first magnetic path member 46 and common disc 6 form one main magnetic path 50 of closed loop configuration in cooperation with the gap spaces $L_a$ and $L_b$. The magnetic flux of the main magnetic path 50 is indicated by $\phi_1$. On the other hand, the magnetic flux generated from the N-pole of the first magnetic segment 5a not only forms the aforementioned main magnetic path 50 between the first and second magnetic segments 5a and 5b but also flows to the center direction of the ring-shaped first magnetic path member 46. That is to say, as shown by arrows in FIG. 27, a part of the the magnetic flux generated from the N-pole of the first magnetic segment 5a reaches the element 13 through the gap space $L_a$, tooth profile projection 46a and inner surface 46b of the ring-shaped first magnetic path member 46, and returns back to the S-pole of the first magnetic segment 5a through the radial flange portion 42b and cylindrical portion 42a of the cylindrical magnetic path member 42, pivot air gap and common disc 6. In this way, the part of the the magnetic flux generated from the N-pole of the first magnetic segment 5a forms a first bypass magnetic path 51 the magnetic flux of which is indicated by $\phi_2$. On the other hand, as shown in FIG. 26, the magnetic force generated at the N-pole of the second magnetic segment 5b forms a second bypass magnetic path 52 which is opposite in polarity to the first bypass magnetic path 51 and which reaches the element 13 through the common disc 6, pivot air gap, cylindrical portion 42a and radial flange portion 42b of the cylindrical magnetic path member 42 and returns back to the S-pole of the second magnetic segment 5b through the inner surface 46b and tooth profile projection 46a of the ring-shaped magnetic path member 46 and gap space $L_a$. The magnetic flux of the second bypass path 52 is indicated by $-\phi_2$. The strength of magnetic flux impressed to the element 13 is determined by the magnitude of the gap spaces $L_a$, $L_b$ or pivot air gap which is extremely small in magnetic permeability as compared with the common disc 6 or magnetic path material of large magnetic permeability. Each of the cylindrical magnetic path member 42, ring-shaped magnetic path member 46 and common disc 6 forms a common magnetic path both at the time the torque is zero and at the time the torque is applied, and therefore, even if they are degraded due to secular change and the like, a detection accuracy of torque would not be reduced.

Thus, in the case that the torque is zero, the magnetic flux $\phi_1$ in the main magnetic path 50 is extremely larger than the magnetic flux $\phi_2$ in the first bypass path 51 and the absolute value of the magnetic flux $-\phi_2$ in the second bypass path 52, and therefore the magnetic flux does not almost enters the first and second bypass paths 51 and 52 wherein the element 13 is provided. In addition, since the gap spaces $L_a$ and $L_b$ are equal to each other, even if a part of the magnetic flux passes through the bypass paths 51 and 52, the magnetic flux $\phi_2$ in the first bypass path 51 and the magnetic flux $-\phi_2$ in the second bypass path 52 will be equal in magnitude to each other. Consequently, they are cancelled with each other and the torque is not detected by the element 13.

In the case that the torque is applied in the direction $T_A$ as shown in FIG. 26, the gap space $L_a$ from the first magnetic segment 5a to the tooth profile projection 46a increases, and on the contrary, the gap space $L_b$ from the second magnetic segment 5b to the tooth profile projection 46a decreases. Consequently, the magnetic flux $-\phi_2$ of the second bypass magnetic path 52 decreases in resistance of magnetic path, while the magnetic flux $\phi_1$ of the main magnetic path 50 and the magnetic flux $\phi_2$ of the first bypass magnetic path 51 increase in resistance of magnetic path. As a result, the flow of the magnetic flux transfers from the main magnetic path 50 toward the second bypass magnetic path 52, and the magnetic flux $-\phi_2$ becomes larger than the magnetic flux $\phi_2$ in proportion to the magnitude of the angle of torsion in the direction $T_A$. For example, if the direction in which the magnet field is impressed to the element 13 by the torque in the direction $T_A$ is a plus direction and the output voltage of the element 13 is adjusted to be a plus value, the magnitude and direction of the torque generated and the static torque can be detected suitably as shown in FIG. 8.

In the case that the torque is applied in the direction $T_B$ as shown in FIG. 27, the magnetic flux $\phi_2$ of the first bypass magnetic path 51 becomes larger than the magnetic flux $-\phi_2$ of the second bypass magnetic path 52, and the torque can be detected in the opposite direction to the above case that the torque is applied in the direction $T_A$.

Referring to FIGS. 28, 29, 30, 31, 32, 33 and 34, there is shown another torque sensor constructed in accordance with a fifth embodiment of the present invention. The members and structures shown in FIGS. 28, 29, 30, 31, 32 and 33 corresponding to those of the aforementioned fourth embodiment shown in FIGS. 22, 23 and 24 are designated by like reference numerals to avoid the description or detailed description.

A non-magnetic sleeve 4 forming a part of a torque detecting mechanism indicated generally by reference numeral 61 is provided with a plurality of magnetic segments 5 each having the same pole as a fixed magnetic pole at an inner end face 4c of the sleeve 4. In this embodiment, each magnetic segment 5 has a N-pole as a fixed magnetic pole at the inner end face 4c of the sleeve 4. It is noted that each magnetic segment 5 may have a S-pole as a fixed magnetic pole at the inner end face 4c. In this embodiment, the magnetic segments 5 comprise sixteen magnetic segments. A cylindrical magnetic path member 42 is fixedly mounted on an outer surface 1a of a first shaft 1 adjacent a small diameter portion 2 between the first shaft and a second shaft 3. The cylindrical magnetic path member 42 has a cylindrical portion 42a and a radial flange portion 42b. On an outer surface 42c of the cylindrical portion 42a of the cylindrical magnetic path member 42 is fixedly mounted a pickup member 44 of non-magnetic material. The pickup member 44 has a ring-shaped magnetic path member 63 mounted on an outer annular end face 44b thereof. The ring-shaped magnetic path member 63 is formed with a plurality of tooth profile projections 63a corresponding in number to the fixed magnetic poles of the magnetic segments 5. Each tooth profile projection 63a is arranged so that it faces two adjacent fixed magnetic poles of the magnetic segments 5 and is located midway between the two adjacent fixed magnetic poles. In this embodiment, the tooth profile projections 63a comprise sixteen tooth profile projections. The tooth profile projection 63 constitutes a first magnetism pickup path member, while the cylindrical magnetic path member 42 constitutes a second magnetism pickup path member for returning magnetic flux passing through the first magnetism pickup path member 46a to the fixed magnetic pole of each magnetic segment 5. Consequently, a first space gap from one of the two adjacent segments 5 to the tooth profile projection 63a between the two adjacent segments 5 is equal to a second space gap from the other of the two adjacent segments 5 to the tooth profile projection 63a between the two adjacent segments 5. As a result, as the first shaft 1 is rotated in the circumferential direction A or B of the first shaft 1, the first and second gap spaces are varied. A magnetism detecting element 13 is provided in the first shaft 1 so that it does not contact with the first shaft 1 and adapted for detecting an amount of magnetic flux passing through the first and second magnetism pickup path members 63 and 42. The displacement of torsion of the first shaft 1 with respect to the second shaft 3 is detected by change in magnetic flux passing through the first and second magnetism pickup path members 63a and 42 when the first magnetism pickup path member 63a located midway between two adjacent fixed magnetic poles of the magnetic segments 5 is displaced toward the fixed magnetic pole by torsional displacement of the first shaft 1 with respect to the second shaft 3.

The operation of the torque sensor in accordance with the fourth embodiment of the present invention will hereinafter be described.

The mechanical torsional displacement between the first and second shafts 1 and 3 is converted into change of the gap space between the magnetic segment and the tooth profile projection 63a, and changes in a flow of magnetic flux and in an amount of magnetic flux caused by the changes of the gap spaces are detected by the element 13 without the contacting, and as a result the torque is detected.

As shown in FIG. 31, in the case that the torque is zero, the space gap from one of the two adjacent segments 5 to the tooth profile projection 63a between the two adjacent segments 5 is equal to the space gap from the other of the two adjacent segments 5 to the tooth profile projection 63a between the two adjacent segments 5. The magnetic flux generated from the N-poles of the two adjacent segments 5 reaches the element 13 through the space gaps and tooth profile projection 63a and returns to the S-poles of the two adjacent segments 5 through the radial portion 42b and cylindrical portion 42a of cylindrical second magnetic path member 42 and a common ring 6. In this way, each magnetic segment 5, tooth profile projection 63a of the ring-shaped first magnetic path member 63 and common disc 6 form a magnetic path of closed loop configuration. In this instance, the strength of magnetic flux impressed to the element 13 is determined by the magnitude of the gap space or pivot air gap which is extremely small in magnetic permeability as compared with the common disc 6 or magnetic path material of large magnetic permeability, and since each gap space between the magnetic segment 5 and the tooth profile projection 63a is relatively large when the torque is zero, the strength of magnetic flux impressed to the element 13 is substantially zero, and therefore the torque is not detected.

Figure 34:
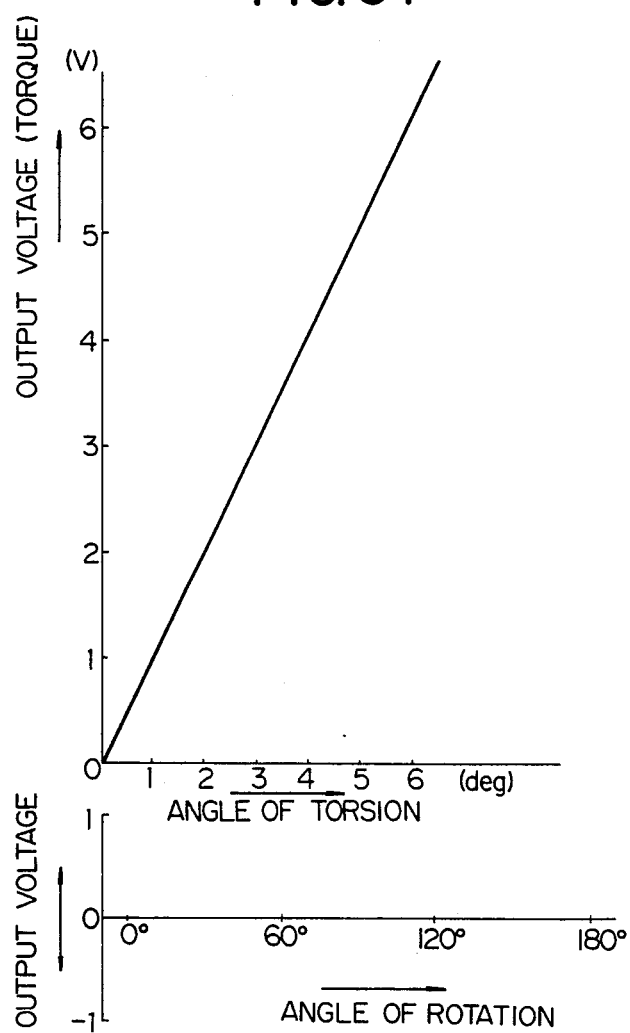
FIG. 34 shows a torque characteristic of the torque detecting mechanism according to the fifth embodiment of the present invention.

In the case that the torque is applied in the direction $T_A$ as shown in FIG. 32 or in the direction $T_B$ as shown in FIG. 33, the gap space from the magnetic segment to the tooth profile projection 63a decreases, and the resistance of magnetic path decreases correspondingly. Consequently, the magnitude of magnetic flux increases in proportion to the magnitude of an angle of torsion applied in the direction $T_A$ or $T_B$. As a result, the magnitude and direction of the torque generated and the static torque can be detected suitably as shown in FIG. 34.

From the foregoing description, it will be seen that an improved torque sensor of the non-contact type which is structurally simple, less expensive and has an excellent responsive performance, is afforded by the present design. While certain representative embodiments and details have been shown for the purpose of illustrating the invention, it will be apparent to those skilled in this art that various changes and modifications may be made therein without departing from the spirit or scope of the invention.

What we claim is:

1. A torque sensor comprising
a first shaft having a fore end portion which is constructed such that a displacement of torsion thereof occurs in the circumferential direction of said fore end portion;
a second shaft connected to said first shaft through said fore end portion;
a plurality of first magnetic segments each having a N-pole as a fixed magnetic pole and second magnetic segments each having a S-pole as a fixed magnetic pole, the first and second segments being secured to the second shaft so that the first and second magnetic segments surround said fore end portion of said first shaft and are alternately arranged equiangularly with respect to said fore end portion;
a plurality of first magnetism pickup path members and second magnetism pickup path members corresponding in number to said N-pole of said first magnetic segments and said S-pole of said second magnetic segment, respectively, the first and second pickup path members being alternately arranged so that each path member faces two adjacent first and second magnetic segments and is located midway between the two adjacent first and second magnetic segments;
an outer ring to which said first magnetism pickup path members are connected;
an inner ring to which said second magnetism pickup path members are connected; and
a magnetism detecting element provided between said outer and inner rings and adapted for detecting change in magnetic flux passing through said first and second magnetism pickup path members;
said displacement of torsion of said first shaft with respect to said second shaft being detected by change in magnetic flux passing through said first and second magnetism pickup path members when said N-pole of said first magnetic segment is displaced toward said first or second magnetism pickup path member by torsional displacement of said first shaft with respect to said second shaft.

2. A torque sensor comprising
a first shaft having a fore end portion which is constructed such that a displacement of torsion thereof occurs in the circumferential direction of said fore end portion;
a second shaft connected to said first shaft through said fore end portion;
a plurality of first magnetic segments each having a N-pole as a fixed magnetic pole and second magnetic segments each having a S-pole as a fixed magnetic pole, the first and second segments being secured to the second shaft so that the first and second magnetic segments surround said fore end portion of said first shaft and are alternately arranged equiangularly with respect to said fore end portion;

a plurality of first magnetism pickup path members and second magnetism pickup path members corresponding in number to said N-pole of said first magnetic segments and said S-pole of said second magnetic segments, respectively, the first and second pickup path members being alternately arranged so that each path member faces two adjacent first and second magnetic segments and is located midway between the two adjacent first and second magnetic segments;

an outer ring to which said first magnetism pickup path members are connected;

an inner ring to which said second magnetism pickup path members are connected; and a plurality of magnetism detecting elements each provided between said outer and inner rings and each adapted for detecting change in magnetic flux passing through said first and second magnetism pickup path members, at least two said magnetism detecting elements being provided at predetermined angles with respect to a center axis of said first shaft so that a mechanical eccentricity in said first and second magnetism pickup path members from said center axis of said first shaft is corrected;

said displacement of torsion of said first shaft with respect to said second shaft being detected by change in magnetic flux passing through said first and second magnetism pickup path members when said N-pole of said first magnetic segment is displaced toward said first or second magnetism pickup path member by torsional displacement of said first shaft with respect to said second shaft.

3. A torque sensor as set forth in claim 2, in which said plurality of magnetism detecting elements comprises two magnetism detecting elements which are adapted for correcting said eccentricity and which are spaced with each other an angle of 180 degrees with respect to said center axis of said first shaft.

4. A torque sensor as set forth in claim 2, in which said plurality of magnetism detecting elements comprises first and second magnetism detecting elements which are spaced with each other an angle of 180 degrees with respect to said center axis of said first shaft, and a third magnetism detecting element which is adapted for correcting unevenness in magnetic flux between said first and second pickup members which are corrected in said eccentricity.

5. A torque sensor comprising a first shaft having a fore end portion which is constructed such that a displacement of torsion thereof occurs in the circumferential direction of said fore end portion;

a second shaft connected to said first shaft through said fore end portion;

a plurality of pairs of first magnetic segments having a N-pole as a fixed magnetic pole and second magnetic segments having a S-pole as a fixed magnetic pole, the first and second segments being secured to the second shaft so that said first and second magnetic segments surround said fore end portion of said first shaft;

a plurality of first magnetism pickup path members corresponding in number to said pairs of said first magnetic segment and second magnetic segment, each magnetism pickup path member being arranged so that it faces two adjacent N-pole and S-pole of said pair of fixed magnetic poles and is located midway between said two adjacent N-pole and S-pole;

a second magnetism pickup path member for returning magnetic flux passing through said first magnetism pickup path members to each fixed magnetic pole;

a magnetism detecting element provided between said first magnetism pickup path members and said second magnetism pickup path member and adapted for detecting an amount of magnetic flux passing through said first and second magnetism pickup path members;

said displacement of torsion of said first shaft with respect to said second shaft being detected by change in magnetic flux passing through said first and second magnetism pickup path members when said first magnetism pickup path member is displaced toward said N-pole or S-pole of said pair by torsional displacement of said first shaft with respect to said second shaft.

6. A torque sensor as set forth in claim 5, in which said first magnetism pickup path members are constituted by eight tooth profile projections fixed with respect to said first shaft.

7. A torque sensor comprising a first shaft having a fore end portion which is constructed such that a displacement of torsion thereof occurs in the circumferential direction of said fore end portion;

a second shaft connected to said first shaft through said fore end portion;

a plurality of magnetic segments each having the same pole as a fixed magnetic pole, the segments being secured to the second shaft so that the magnetic segments surround said fore end portion of said first shaft;

a plurality of first magnetism pickup path members corresponding in number to said fixed magnetic poles of said magnetic segments; each magnetism pickup path member being arranged so that it faces two adjacent fixed magnetic poles and is located midway between said two adjacent fixed magnetic poles;

a second magnetism pickup path member for returning magnetic flux passing through said first magnetism pickup path members to each fixed magnetic pole;

a magnetism detecting element provided between said first magnetism pickup path members and said second magnetism pickup path member and adapted for detecting an amount of magnetic flux passing through said first and second magnetism pickup path members;

said displacement of torsion of said first shaft with respect to said second shaft being detected by change in magnetic flux passing through said first and second magnetism pickup path members when said first magnetism pickup path member located midway between said two adjacent fixed magnetic poles is displaced toward said fixed magnetic pole by torsional displacement of said first shaft with respect to said second shaft.

8. A torque sensor as set forth in claim 7, in which said first magnetism pickup path members are constituted by sixteen tooth profile projections fixed with respect to said first shaft.

* * * * *